(12) United States Patent
Kobayashi et al.

(10) Patent No.: US 8,948,990 B2
(45) Date of Patent: Feb. 3, 2015

(54) PARKING ASSIST CONTROL APPARATUS AND CONTROL METHOD

(75) Inventors: Masahiro Kobayashi, Isehara (JP); Takuya Inoue, Sagamihara (JP); Youji Hamaguchi, Zama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 205 days.

(21) Appl. No.: 13/806,051

(22) PCT Filed: Jun. 9, 2011

(86) PCT No.: PCT/JP2011/063204
§ 371 (c)(1),
(2), (4) Date: Feb. 14, 2013

(87) PCT Pub. No.: WO2011/162108
PCT Pub. Date: Dec. 29, 2011

(65) Prior Publication Data
US 2014/0324310 A1    Oct. 30, 2014

(30) Foreign Application Priority Data

Jun. 25, 2010   (JP) ................................ P2010-144804
Feb. 18, 2011   (JP) ................................ P2011-033011

(51) Int. Cl.
*G06F 7/70*     (2006.01)
*B60W 30/06*    (2006.01)
*B60W 30/09*    (2012.01)

(52) U.S. Cl.
CPC ............... *B60W 30/06* (2013.01); *B60W 30/09* (2013.01)
USPC ........................................ 701/70; 340/932.2

(58) Field of Classification Search
CPC ........................................................ G08G 1/14
USPC ......... 701/36, 41, 301, 42, 70, 48; 340/932.2, 340/435, 436
See application file for complete search history.

(56) References Cited

U.S. PATENT DOCUMENTS

| 8,068,957 | B2 | 11/2011 | Shimizu |
| 2005/0236201 | A1 | 10/2005 | Spannheimer et al. |

(Continued)

FOREIGN PATENT DOCUMENTS

| EP | 1 690 777 B1 | 3/2008 |
| GB | 2 334 560 A | 6/1999 |

(Continued)

OTHER PUBLICATIONS

Supplementary European Search Report dated Jul. 25, 2014, 6 pgs.

*Primary Examiner* — Thomas G Black
*Assistant Examiner* — Luke Huynh
(74) *Attorney, Agent, or Firm* — Foley & Lardner LLP

(57) ABSTRACT

A parking assist control apparatus includes an obstacle detector that detects an obstacle around a vehicle; a parking operation assist unit that executes a parking operation assist for preventing a close approach between the obstacle and the vehicle when judges that a distance of the obstacle to the vehicle becomes equal-to or shorter-than a predetermined control start distance; a parking start judgment unit that judges a parking operation; a parking progress judgment unit that judges a parking progress degree during the parking operation judged by the parking start judgment unit; and a parking progress computing unit that reduces an assist control amount by the parking operation assist unit according to the parking progress degree judged by the parking progress judgment unit. According to the parking assist control apparatus, the parking operation assist for the obstacle around the vehicle can be executed more adequately.

15 Claims, 14 Drawing Sheets

(56) References Cited

U.S. PATENT DOCUMENTS

| | | |
|---|---|---|
| 2008/0195285 A1 | 8/2008 | Shimizu |
| 2011/0175714 A1 | 7/2011 | Kobayashi et al. |

FOREIGN PATENT DOCUMENTS

| | | | |
|---|---|---|---|
| JP | 08-287398 A | | 11/1996 |
| JP | 11-314564 | * 11/1999 | ................ B60T 7/12 |
| JP | 11-314564 A | | 11/1999 |
| JP | 2001-030936 A | | 2/2001 |
| JP | 2005-112267 A | | 4/2005 |
| JP | 2006-021722 A | | 1/2006 |
| JP | 2008-195263 A | | 8/2008 |
| JP | 2011-126337 A | | 6/2011 |
| WO | WO 2004/050458 A1 | | 6/2004 |
| WO | WO 2010/013542 A1 | | 2/2010 |

* cited by examiner

PARKING TARGET POSITION

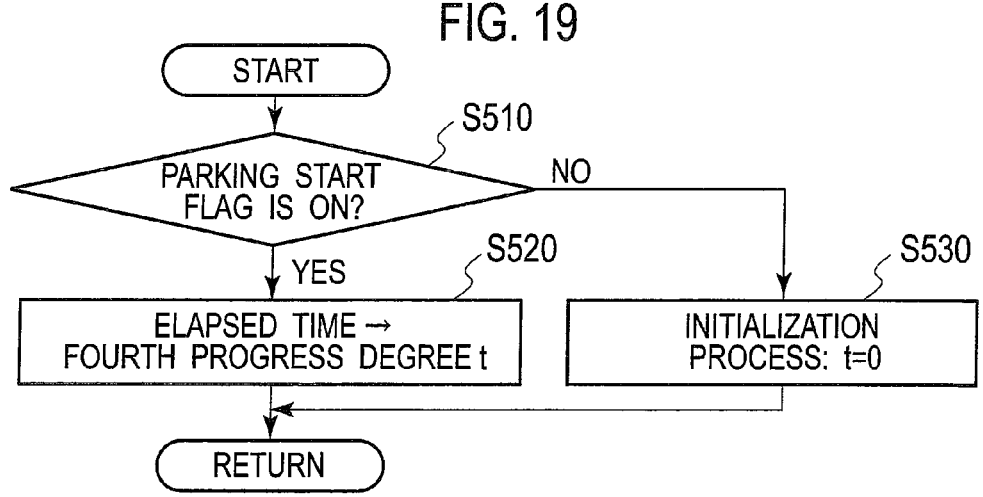
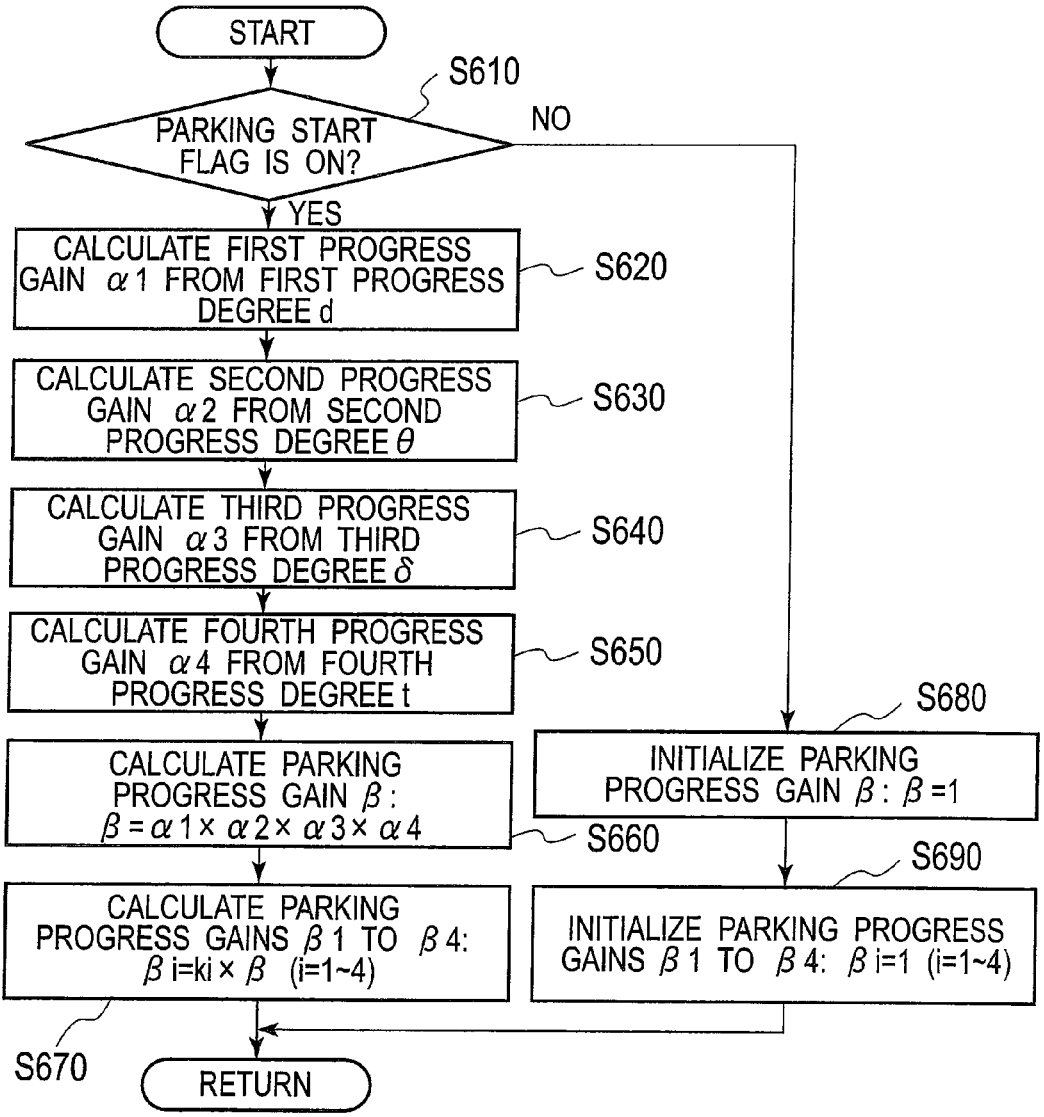

PARKING ASSIST CONTROL APPARATUS AND CONTROL METHOD

TECHNICAL FIELD

The present invention relates to a parking assist control apparatus that executes a driving assist for an obstacle around a vehicle, and a control method.

BACKGROUND ART

As a driving assist for an obstacle around a vehicle, technology disclosed in a Patent Literature 1 listed below is known. In the driving assist disclosed in the Patent Literature 1, a distance to an obstacle in front of or behind a vehicle is detected, and automatic braking is started when the detected distance is shorter than a braking start distance and also an approaching speed to the obstacle is faster than a predetermined speed. In the Patent Literature 1, a parking assist is disclosed as one example of the driving assist.

CITATION LIST

Patent Literature

Patent Literature 1: Japanese Patent Unexamined Publication No. H11-314564

SUMMARY OF INVENTION

In the above driving assist, there is a problem that the automatic braking may give a feeling of strangeness to a driver depending on a driving condition.

An object of the present invention provides a parking assist control apparatus and a control method that can perform a driving assist against an obstacle around a vehicle more adequately.

A first aspect of the present invention provides a parking assist control apparatus that includes: an obstacle detector (obstacle detection means) that detects an obstacle around a vehicle; a parking operation assist unit (parking operation assist means) that executes, when judges that a distance between the obstacle detected by the obstacle detector (obstacle detection means) and the vehicle becomes equal-to or shorter-than a predetermined control start distance, a parking operation assist for preventing a close approach between the obstacle and the vehicle; a parking start judgment unit (parking judgment unit) that judges a parking operation; a parking progress judgment unit (parking progress judgment means) that judges a parking progress degree during the parking operation judged by the parking start judgment unit (parking judgment unit); and a parking progress computing unit (parking progress computing means) that reduces an assist control amount by the parking operation assist unit (parking operation assist means) according to the parking progress degree judged by the parking progress judgment unit (parking progress judgment means).

A second aspect of the present invention provides a parking assist control method that includes: detecting an obstacle around a vehicle; judging whether or not a distance between the obstacle and the vehicle becomes equal-to or shorter-than a predetermined control start distance; executing a parking operation assist for preventing a close approach between the obstacle and the vehicle when it is judged that the distance between the obstacle and the vehicle becomes equal-to or shorter-than a predetermined control start distance; judging a parking progress degree during a parking operation; and reducing a control amount for the parking operation assist according to the parking progress degree that is judged.

BRIEF DESCRIPTION OF DRAWINGS

[FIG. 19] It is a flowchart showing processes performed by a time progress judgment unit.
[FIG. 20] It is a flowchart showing processes performed by a progress gain computing unit.

DESCRIPTION OF EMBODIMENTS

Figure 1:
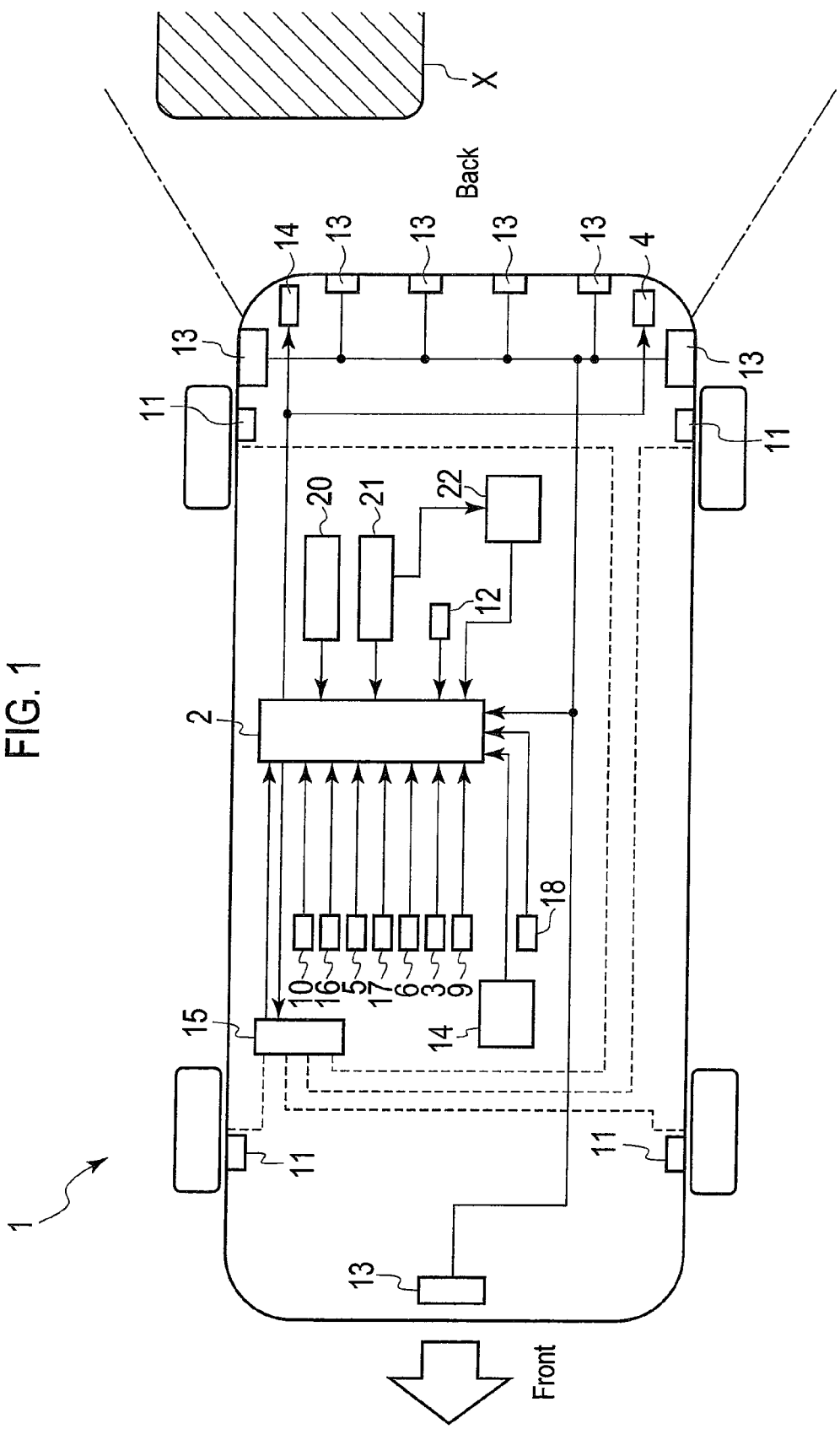
[FIG. 1] It is a configuration diagram of a vehicle that is provided with a parking assist control apparatus.

An embodiment will be explained with reference to the drawings.
(Configuration)
As shown in FIG. 1, a parking assist control apparatus 2, a command switch 3, a brake lamp 4, an acceleration pedal stroke sensor 5, a brake pedal stroke sensor 6, a shift position sensor 9, a steering sensor 10, wheel speed sensors 11, an acceleration sensor 12, a start switch 18, obstacle detectors (obstacle detection means) 13, a drive force generator 14, a brake force generator 15, a pedal reaction force generator 16, and an alarm 17 are installed on a vehicle 1. The command switch 3 is operated by a passenger (a driver), and the passenger commands activation/deactivation of a driving assist apparatus by using the command switch 3. The acceleration pedal stroke sensor 5 is disposed at an acceleration pedal, and detects a stroke (an operated position) of the acceleration pedal. The brake pedal stroke sensor 6 is disposed at a brake pedal, and detects a stroke (an operated position) of the brake pedal. The shift position sensor 9 detects a shift position (a shift range such as P, R, N and D of a selector lever of an automatic transmission) of a transmission. The steering sensor 10 detects a steered angle of a steering wheel. The wheel speed sensors 11 are disposed at road wheels, respectively, and detect rotate speeds of the road wheels (although not shown in FIG. 1, the wheel speed sensors 11 are connected with the parking assist control apparatus 2, respectively). The acceleration sensor 12 detects acceleration of the vehicle 1. The passenger operates activation/deactivation of a drive apparatus (such as an internal combustion engine) by using the start switch 18. The pedal reaction force generator 16 generates reaction force to the acceleration pedal.

In addition, a navigation unit 20, a camera 21, and a parking assist apparatus 22 are installed on the vehicle 1. The navigation system 20 is provided with a GPS, and stores map information. The camera 21 takes a movie of an environment of the vehicle 1.

The parking assist apparatus 22 is automatically activated when a shift range is set to a backward running (R) range. The parking assist apparatus 22 generates a top view image of the vehicle 1 with its environment based on the movie taken by the camera 21, and displays the top view image on a display (not shown) disposed at a driver's seat. Subsequently, when the passenger specifies a parking target position on the top view image, the parking assist apparatus 22 calculates a running path from a current position to the parking target position. Note that a parking target position can be specified by a passenger as explained above, or a parking frame may be automatically set based on the taken movie (or the top view) (for example, the image is processed by an edging process and a parking frame line drawn on a road surface at a parking target position is detected from an image processed by the edge process). Note that, in the present embodiment, a parking frame can be detected from an image even when a parking target position is specified by a passenger.

Subsequently, the parking assist apparatus 22 displays the running path on the display by interposing it over the top view image, and outputs a distance from the current position to the parking target position to the parking assist control apparatus 2. Here, the distance from the current position to the parking target position may be a shortest distance (a linear distance) or a distance along the running path from the current position to the parking target position.

Figure 2:
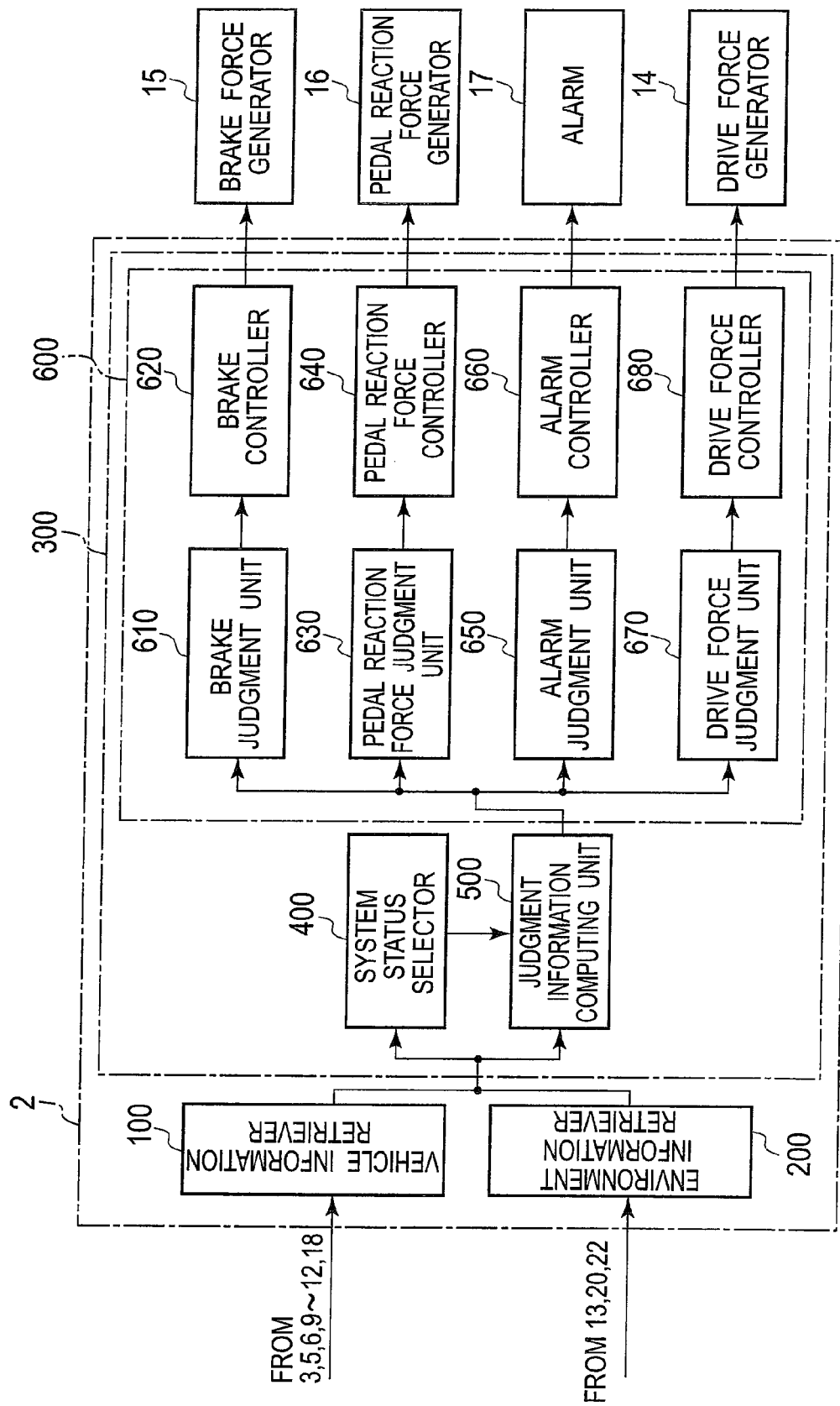
[FIG. 2] It is a block diagram of the parking assist control apparatus.

Note that a parking assist by the parking assist apparatus 22 may be done so that a steered angle of a steering wheel is controlled to run the vehicle 1 along the running path, but not limited to this. As shown in FIG. 2, the parking assist control apparatus 2 includes a vehicle information retriever 100, a vehicle speed computing unit 200, and a main controller 300. The parking assist control apparatus 2 achieves a driving assist by controlling the brake force generator 15, the pedal reaction force generator 16, the alarm 17, and the drive force generator 14.

The obstacle detectors 13 detect an obstacle X around the vehicle 1. The obstacle detectors 13 in the present embodiment are sensors installed on the vehicle 1, such as sonar or laser distance meters, and emit emitted waves such as electromagnetic waves and sonic waves to a predetermined area and receive reflected waves. Note that the obstacle detectors 13 may be cameras for taking movies of the predetermined area. In the present embodiment, although an example in which an obstacle X behind the vehicle X is a control object of the obstacle detectors 13 will be explained, it is possible that an obstacle in front of or beside the vehicle 1 may be a control object.

(Vehicle Information Retriever 100)

Figure 3:
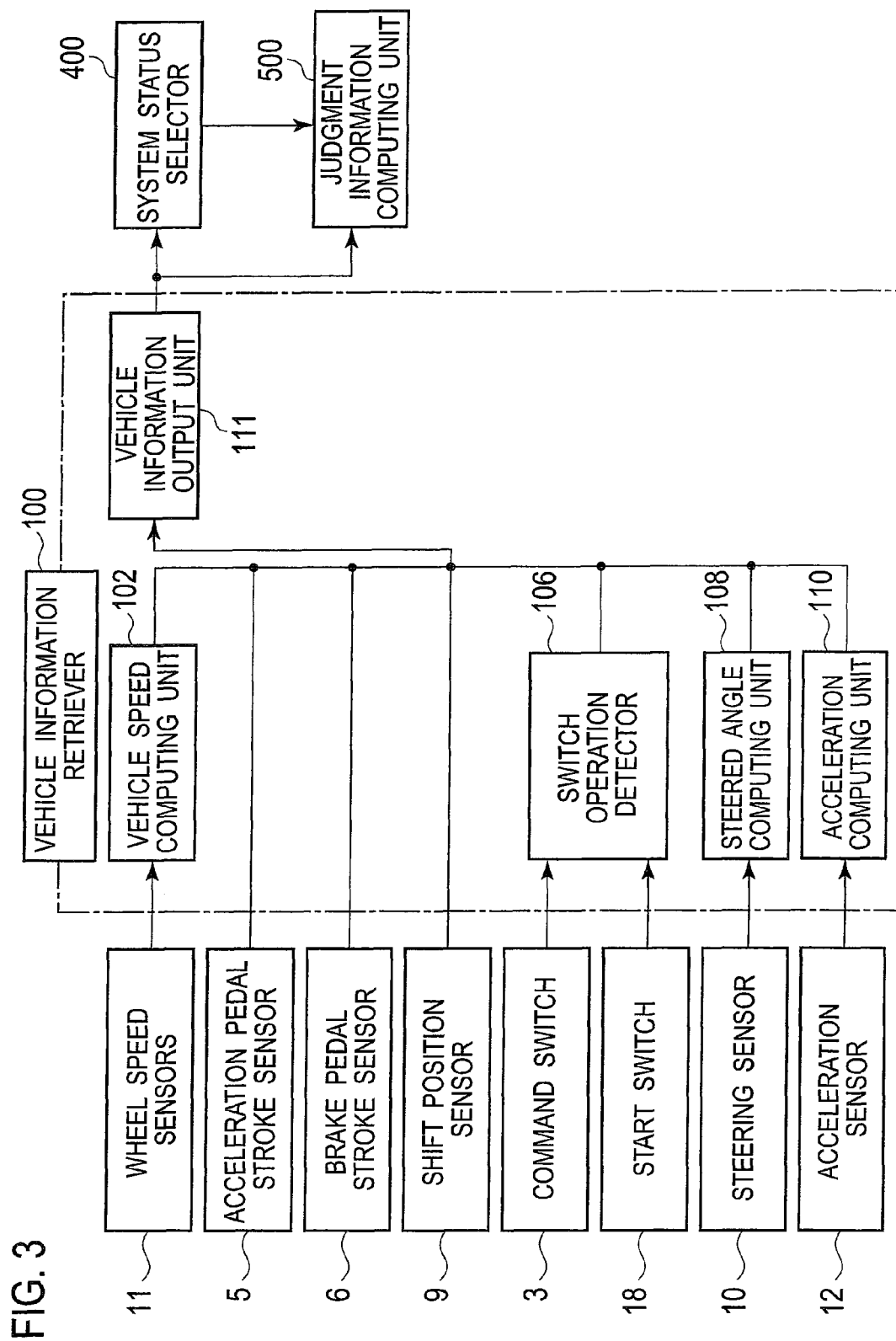
[FIG. 3] It is a block diagram of a vehicle information retriever.

The vehicle information retriever 100 retrieves information of the vehicle 1. As shown in FIG. 3, the vehicle information retriever 100 in the present embodiment includes a vehicle speed computing unit 102, a switch operation detector 106, a steered angle computing unit 108, an acceleration computing unit 110, and a vehicle information output unit 111.

The vehicle speed computing unit 102 calculates a vehicle speed based on wheel speeds (rotational speeds of road wheels) detected by the wheel speed sensors 11 and diameters of tires of the vehicle 1. When calculating a vehicle speed, a filtering process or an averaging process may be done, if needed. In addition, the vehicle speed computing unit 102 calculates a travel distance of the vehicle 1 by integrating the vehicle speed.

The switch operation detector 106 detects a passenger's operation to the command switch 3. The switch operation detector 106 also detects an operation to the start switch 8.

The start switch 8 is operated by a passenger to command an activate/deactivate of the drive apparatus when start/finish a driving of the vehicle 1. For example, in a case where the drive apparatus is an internal combustion engine, the start switch 18 is an ignition switch for starting/stopping the internal combustion engine. In a case where the vehicle 1 is an electric vehicle and the drive apparatus is an electric motor(s), the start switch 18 is a switch for starting/stopping the electric motor. In a case where a the vehicle 1 is a hybrid electric vehicle and the drive apparatus is an electric motor and an internal combustion engine, the start switch 18 is a switch for starting/stopping a main drive source that is any one of the electric motor and the internal combustion engine.

The steered angle computing unit 108 calculates a steered angle of a steering wheel from the steering sensor 10. In this regard, the steered angle is processed by a filtering process, if needed.

The acceleration computing unit 110 calculates an acceleration of the vehicle 1 from the acceleration sensor 12. In this regards, the acceleration is processed by a filtering process, if needed.

The vehicle information output unit 111 outputs a vehicle speed (a travel distance) calculated by the vehicle speed computing unit 102, an acceleration pedal stroke from the acceleration pedal stroke sensor 5, a brake pedal stroke from the brake pedal stroke sensor 6, a shift range from the shift position sensor 9, operational statuses of the command switch 3 and the start switch 18 detected by the switch operation detector 106, a steered angle calculated by the steered angle computing unit 108, and an acceleration of the vehicle calculated by the acceleration computing unit 110 to a system status selector 400 and a judgment information computing unit 500.

Note that the vehicle information retriever 100 may retrieve other vehicle information. In addition, according to a system configuration, it may be configured not to retrieve information unnecessary in the system configuration.

(Environment Information Retriever 200)

Figure 4:
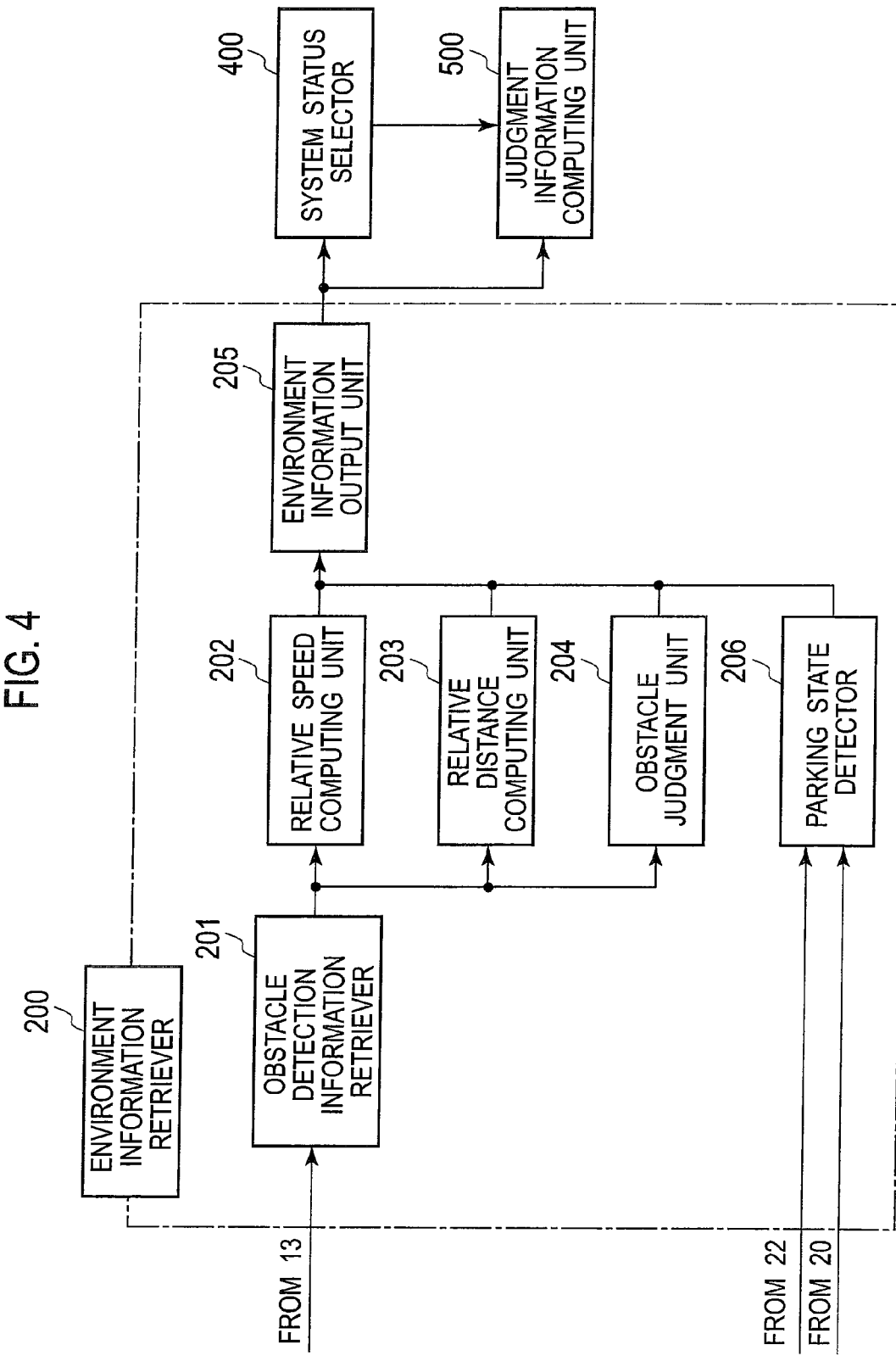
[FIG. 4] It is a block diagram of an environment information retriever.

As shown in FIG. 4, the environment information retriever 200 includes an obstacle information retriever 201, a relative speed computing unit 202, a relative distance computing unit (distance detection means) 203, an obstacle judgment unit 204, a parking state detector 206, and an environment information output unit 205.

The obstacle information retriever 201 retrieves a time from an emission of an emitted wave to a reception of a reflected wave (hereinafter, referred as a reflection time).

The relative distance computing unit 203 calculates a relative distance of an obstacle around the vehicle 1 (a distance from the vehicle 1 to the obstacle X) based on the reflection time. Here, the relative distance computing unit 203 may detect a shape of the obstacle X by calculating distances to multi points on the obstacle X. Note that, if the obstacle detectors 13 are cameras, a relative distance can be calculated based on a position of the obstacle X within a taken image frame. In addition, the relative distance computing unit 203 may operate a filtering process such as a noise reduction, if needed. Note that, if plural obstacles are detected, the relative distance computing unit 203 calculates a relative distance of an obstacle closest to the vehicle 1 that is specified as the obstacle X of a control object.

The relative speed computing unit 202 calculate a relative distance of the obstacle X to the vehicle 1 based on the reflection time, and calculates a relative speed of the obstacle X by differentiating the relative distance. Note that a relative speed can be calculated from frequency of the reflected wave if the obstacle detectors 13 are millimeter-wave radars, and thereby calculation of a relative distance is not unnecessary in this case. Note that the relative speed computing unit 202 may calculate a relative speed based on the relative distance calculated by the relative distance computing unit 203. In addition, the relative speed computing unit 202 may operate a filtering process such as a noise reduction, if needed.

The obstacle judgment unit 204 judges whether or not an obstacle exists based on the reflection time. For example, if the reflection time is infinite (i.e. no detection of the reflected wave) or equal-to or longer than a predetermined time, the obstacle judgment unit 204 judged that no obstacle X exists. If the reflection time is shorter than the predetermined time, the obstacle judgment unit 204 judged that an obstacle X exists.

The parking state detector 206 detects a distance from a current position to the parking target position. In addition, the parking state detector 206 retrieves a current position measured by a GPS and map information from the navigation system, and judges whether or not the vehicle 1 is in a parking lot (a parking area). Namely, a position on a map corresponding to the measured current position is detected, and it is judged whether or not the detected position is in the parking lot on the map. The distance from the current position to the parking target position and the judgment result whether or not the vehicle 1 is in a parking lot is output to the environment information output unit 205.

The environment information output unit 205 outputs values (information) from the relative speed computing unit 202, the relative distance computing unit 203, the obstacle judgment unit 204 and the parking state detector 206 to the system status selector 400 and the judgment information computing unit 500.

(Main Controller 300)

As shown in FIG. 2, the main controller 300 includes a parking operation assist unit (parking operation assist means) 600 in addition to the system status selector 400 and the judgment information computing unit 500. The parking operation assist unit 600 includes a brake judgment unit 610, a brake controller 620, a pedal reaction force judgment unit 630, a pedal reaction force controller 640, an alarm judgment unit 650, an alarm controller 660, a drive force judgment unit 670, and a drive force controller 680.

(System Status Selector 400)

The system status selector 400 set a system status that indicates whether or not to execute the driving assist control to an "ON status (ST-FLAG=ON)" or an "OFF status (ST-FLAG=OFF)" based on an operated state of the command switch 3 from the switch operation detector 106 of the vehicle information retriever 100.

(Judgment information Computing Unit 500)

The judgment information computing unit 500 executes calculations with respect to after-explained judgment information when both conditions (1) and (2) listed below are met.

(1) the shift range is set to an R-range (a drive range for a backward running)

(2) the system status is the ON status

In the present embodiment, an obstacle X existing behind the vehicle 1 is an object, so that the above condition (1) is set. If an obstacle X existing in front of the vehicle 1 is also an object, the above condition (1) may be changed to "the shift range is set to a D-range or an R-range".

In addition, at least one condition of "the vehicle speed<a preset vehicle speed" and "the steered angle<a preset steered angle" may be added to the above condition (2).

Figure 5:
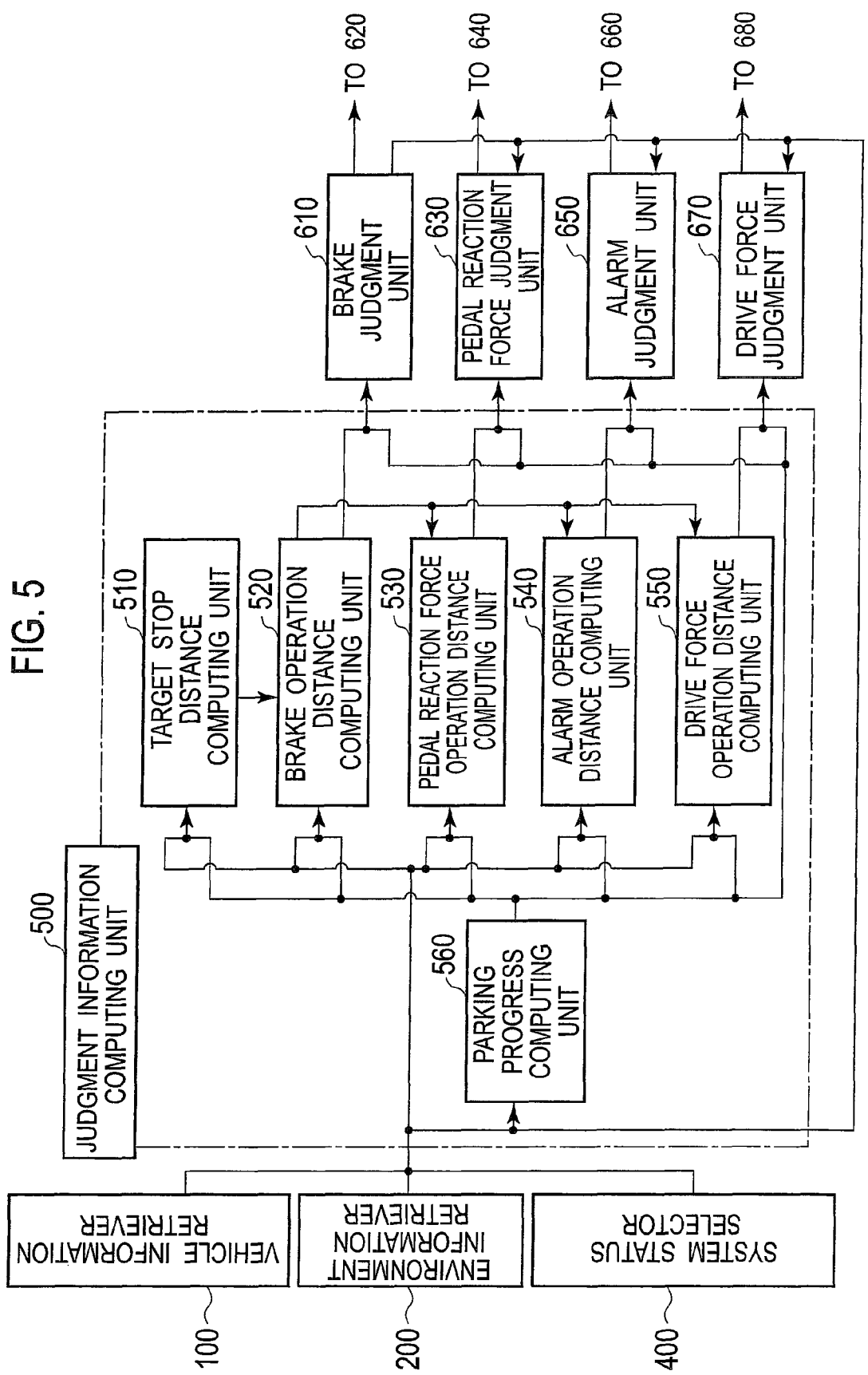
[FIG. 5] It is a block diagram of a judgment information computing unit.

The judgment information computing unit 500 executes a setting of a control start distance and a restriction judgment. As shown in FIG. 5, the judgment information computing unit 500 includes a target stop distance computing unit 510, a brake operation distance computing unit 520, a pedal reaction force operation distance computing unit 530, an alarm operation distance computing unit 540, a drive force operation distance computing unit 550, and a parking progress computing unit (an assist control amount reduction means) 560.

The target stop distance computing unit 510 calculates a target stop distance Ls. The target stop distance is a preset value, and may be varied according to a vehicle speed, for example, may be set longer as a vehicle speed becomes higher.

The brake operation distance computing unit 520 calculates a brake operation distance Lsb for starting braking by the driving assist control. In the brake operation distance computing unit 520 in the present embodiment, the brake operation distance Lsb is calculated by adding an operation distance according to a vehicle speed to the target stop distance Ls as shown in an equation (I) shown below.

(Brake operation distance $Lsb$)=(Target stop distance $Ls$)+(Operation distance according to vehicle speed) (I)

Here, the "operation distance according to a vehicle speed" is as a larger value as a vehicle speed becomes faster, so that the vehicle 1 is made stopped at a distance close to the target stop distance Ls. Note that the "operation distance according to a vehicle speed" may be varied according to a relative time between the vehicle 1 and the obstacle X that can be calculated from the relative distance and the relative speed to the obstacle X The pedal reaction force operation distance computing unit 530 calculates a pedal reaction force operation distance Lsa for starting applying a reaction force to an acceleration pedal by the driving assist control. In the pedal reaction force operation distance computing unit 530 in the present embodiment, the pedal reaction force operation distance Lsa is calculated by adding an idle running distance according to a vehicle speed to the brake operation distance Lsb as shown in an equation (II) shown below.

(Pedal reaction force operation distance $Lsa$)=(Brake operation distance $Lsb$)+(Idle running distance according to vehicle speed) (II)

The alarm operation distance computing unit 540 calculates an alarm operation distance Lsh for starting an alarm by the driving assist control. In the alarm operation distance computing unit 540 in the present embodiment, the alarm operation distance Lsh is calculated by adding an idle running distance according to a vehicle speed to the brake operation distance Lsb as shown in an equation (III) shown below.

(Alarm operation distance $Lsh$)=(Brake operation distance $Lsb$)+(Idle running distance according to vehicle speed)       (III)

The drive force operation distance computing unit 550 calculates a drive force operation distance Lsf for starting restriction of a drive force by the driving assist control. In the drive force operation distance computing unit 550 in the present embodiment, the drive force operation distance Lsf is calculated by adding an idle running distance according to a vehicle speed to the brake operation distance Lsb as shown in an equation (IV) shown below.

(Drive force operation distance $Lsf$)=(Brake operation distance $Lsb$)+(Idle running distance according to vehicle speed)       (IV)

Therefore, in the present embodiment, a start distant (an assist operation distance) for each controls is set as explained above, so that, when the vehicle 1 approaches to the obstacle X, drive force restriction, an alarm to a driver, and a reaction force application to an acceleration pedal are done first, and then a brake force application is done.

(Parking Progress Computing Unit 560)

Figure 6:
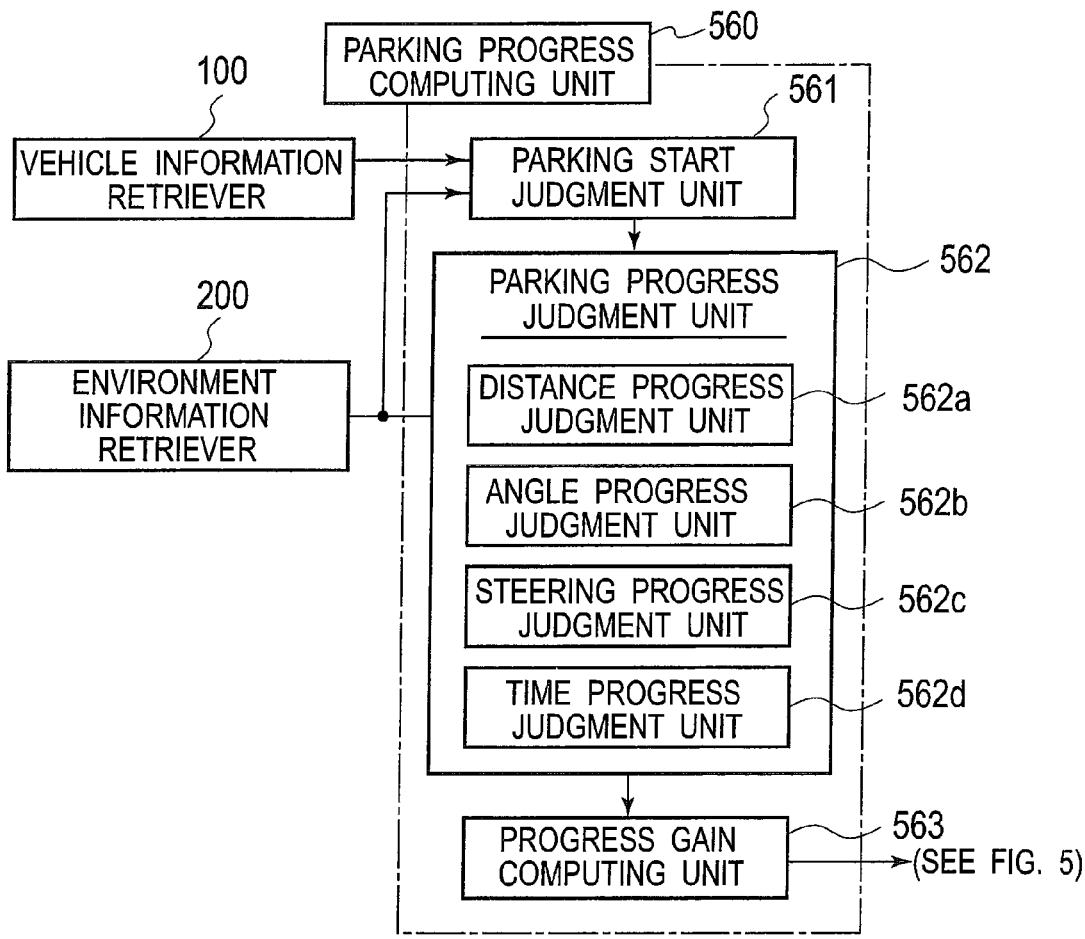
[FIG. 6] It is a block diagram of a parking progress computing unit.

Based on the information from the vehicle information retriever 100 and the environment information retriever 200, the parking progress computing unit 560 judges whether or not the vehicle 1 is traveling to a parking target position, and then, when in the traveling, judges whether or not to restrict the driving assist control. As shown in FIG. 6, the parking progress computing unit 560 includes a parking start judgment unit (parking judgment means) 561, a parking progress judgment unit (parking progress judgment means) 562, and a progress gain computing unit 563, and processes are done in this order.

The parking start judgment unit 561 executes a judgment for a parking start and a judgment whether or not traveling to a parking target position.

Firstly, the parking start judgment unit 561 judges that parking is started, when any one of conditions (a) and (b) listed below is met.

(a) a park-able area (a parking frame) is detected on the top view displayed by the parking assist apparatus 22, and the shift range is set to a backward running (R) range (b) an intention for parking is detected from a passenger's operation (for example, the passenger specifies a parking target position on the top view displayed by the parking assist apparatus 22)

Note that the above parking start judgment may be executed only when it is judged, based on the information from the navigation system 20, that the vehicle 1 is in a parking lot (a parking area).

In addition, in a case where no parking assist apparatus 22 is installed or operated, it may be judged that parking is started when a condition (c) listed below is met.

(c) the shift range is set to a backward running (R) range, and, before the shift range was set to the backward running (R) range, the vehicle 1 had run forward with a forward running (D) range for longer than a predetermined distance (e.g. 5 m) or a predetermined time (e.g. 5 minutes) [but only in a case where time required for changing from the forward running (D) range to the backward running (R) range is done in the predetermined time (e.g. 5 minutes)].

Subsequently, the parking start judgment unit 561 judges that the parking is completed, i.e., that the vehicle 1 is not traveling to the parking target position, when any one of conditions (d) to (f) listed below is met. Therefore, from a time when the parking start judgment unit 561 judged that parking was started to a time when it judges that any of the conditions (e) to (f) is met, it is judged that the vehicle 1 is traveling to a parking target position.

(d) the parking is completed [explained later in detail]

(e) the vehicle 1 is being stopped for a predetermined time (f) the shift range is set to a non-drive (P or N) range Here, the above condition (d) is met, when the current position of the vehicle 1 coincides with the parking target position. Namely, the above condition (d) is met, when a predetermined time has elapsed after the distance from the current position to the parking target position that was detected by the parking assist apparatus 22 and then output from the environment information retriever 200 becomes 0 (or smaller than a predetermined value capable of being considered as almost 0). Note that it may be judged that the above condition (d) is met, when the distance from the current position to the parking target position doesn't change for a predetermined time. Alternatively, it may be judged that the above condition (d) is met, when a predetermined time has elapsed after the vehicle speed that was calculated by the vehicle speed computing unit 102 and then output from the vehicle information retriever 100 becomes 0 (or smaller than a predetermined value capable of being considered as almost 0).

Figure 15:
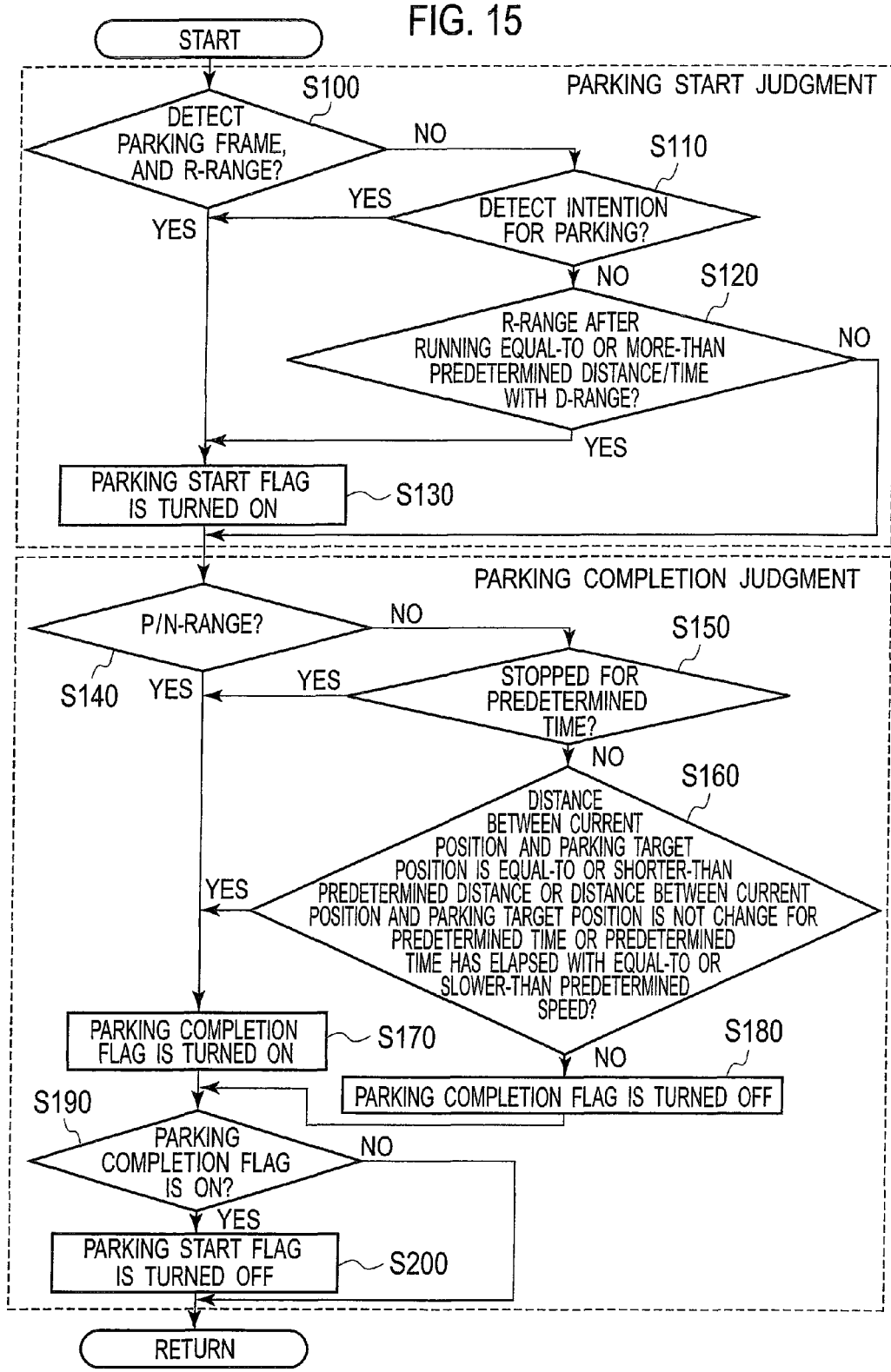
[FIG. 15] It is a flowchart showing processes performed by a parking start judgment unit.

An example of processes by the parking start judgment unit 561 will be explained with reference to FIG. 15. The parking start judgment unit 561 detects a parking frame, and judges whether or not the shift range (the shift position) is changed to a backward running (R) range (step S100). The process flow proceeds to a step S130 if the step S100 is affirmed [the above condition (a) is met], or proceeds to a step S110 if disaffirmed.

When the step S100 is affirmed, it is judged whether or not a passenger's intention to do parking is detected (step S110). The process flow proceeds to a step S130 if the step S110 is affirmed [the above condition (b) is met], or proceeds to a step S120 if disaffirmed.

When the step S110 is disaffirmed, it is judged whether or not the shift range is changed to a backward running (R) range after the vehicle 1 had run forward with a forward running (D) range for longer than a predetermined distance or a predetermined time. The process flow proceeds to the step S130 if the step S120 is affirmed [the above condition (c) is met], or proceeds to a step S140 if disaffirmed.

When any of the steps S100 to S120 is affirmed [any of the above conditions (a) to (c) is met], a parking start flag is set to ON (step S130). When the parking start flag is set to ON in the step S130 or when the step S140 is disaffirmed [the above conditions (a) to (c) are not met], it is judged whether or not the shift range is set to a non-drive (P or N) range (step S140). The process flow proceeds to a step S170 if the step S140 is affirmed [the above condition (f) is met], or proceeds to a step S150 if disaffirmed.

When the step S140 is disaffirmed, it is judged whether or not the vehicle 1 is being stopped for a predetermined time (step S150). The process flow proceeds to the step S170 if the step S150 is affirmed [the above condition (e) is met], or proceeds to a step S160 if disaffirmed.

When the step S150 is disaffirmed, it is judges whether or not any one of three conditions listed below is met (step S160).

a condition where the distance from the current position to the parking target position is shorter than a predetermined distance (a distance capable of being considered as 0)

a condition where the distance from the current position to the parking target position doesn't change for a predetermined time a condition where a predetermined time has elapsed in a state with a vehicle speed lower than a predetermined speed (a vehicle speed capable of being considered as 0)

The process flow proceeds to a step the step S170 if the step S160 is affirmed [the above condition (d) is met], or proceeds to a step S180 if disaffirmed.

When any of the steps S140 to S160 is affirmed [any of the conditions (d) to (f) is met], a parking completion flag is set to ON (step S170), and the process flow proceeds to a step S190.

On the other hand, when the step S160 is disaffirmed [the conditions (d) to (f) are not met], the process flow proceeds to the step S190.

After the parking flag is set in the step S170 or S180, it is judged whether or not the parking completion flag is set to ON (step S190). The process flow proceeds to a step S200 if the parking completion flag is set to ON, or is terminated and then started from the step S100 again if set to OFF.

When the parking start judgment unit 561 judges that parking is started, the parking progress judgment unit 562 judges a parking progress degree from a parking start (running start) to a parking completion (running completion) of the vehicle 1. As shown in FIG. 6, parking progress judgment unit 562 includes a distance progress judgment unit 562a, an angle progress judgment unit 562b, a steering progress judgment unit 562c, and a time progress judgment unit 562d.

The distance progress judgment unit 562a judges the parking progress degree based on a travel distance from the parking start of the vehicle 1.

Figure 7:
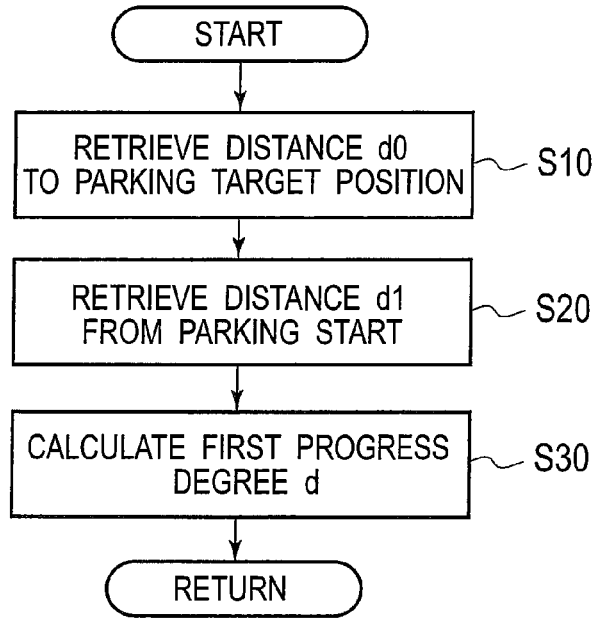
[FIG. 7] It is a flowchart showing processes by a distance progress judgment unit.

Processes by the distance progress judgment unit 562a will be explained with reference to FIG. 7. The distance progress judgment unit 562a retrieves a distance d0 from a parking start position to a parking target position based on the information from the parking assist apparatus 22 (step S10). Namely, it retrieves, as the distance d0, a distance from a parking start position to a parking target position detected by the parking assist apparatus 22 at a time when it is judged that parking is started. The parking target position is set at a position of the detected parking frame, or a parking target position specified by a passenger. If a parking target position cannot be specified, a predetermined distance (e.g. 5 m) is set as the distance d0.

Subsequently, a distance d1 from the parking start position to the current position of the vehicle 1 is retrieved (step S20). Here, the distance d0 from the parking start position to the parking target position may be a shortest distance (a linear distance) or a distance along the running path calculated by the parking assist apparatus 22 from the current position to the parking target position. The same goes for the distance d1. But, when the distance d0 adopts its shortest distance, the distance d1 must also adopt its shortest distance, similarly. Alternatively, when the distance d0 adopts its distance along the running path, the distance d1 must also adopt its distance along the running path, similarly.

After the step S20, a first parking progress degree d is calculated based on an equation (V) shown below. The first parking progress degree d ($\leq 1$) takes a smaller value as closer to the parking completion.

$$d = (d0 - d1)/d0 \quad (V)$$

Figure 16:
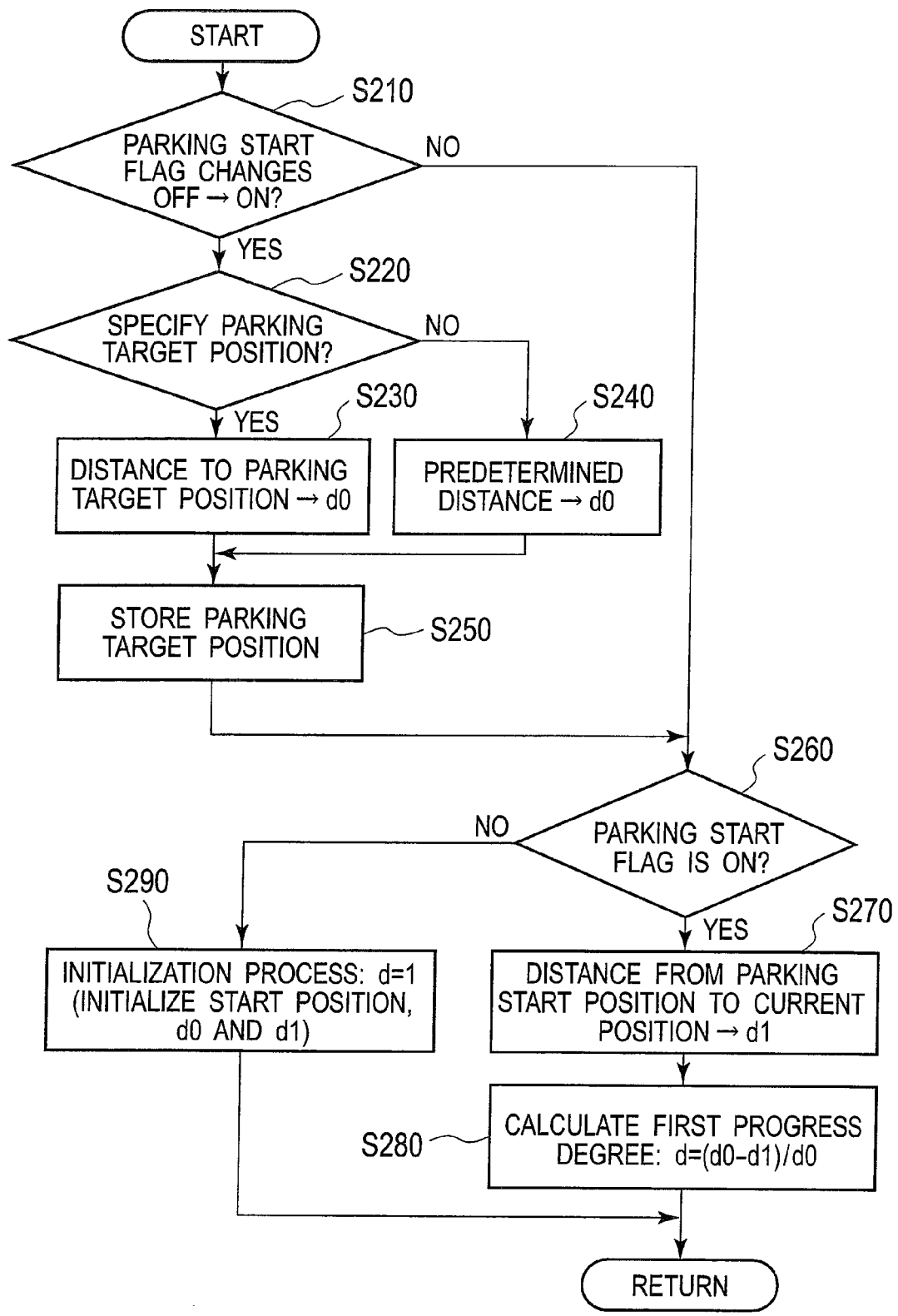
[FIG. 16] It is a flowchart showing processes performed by the distance progress judgment unit.
Figure 17:
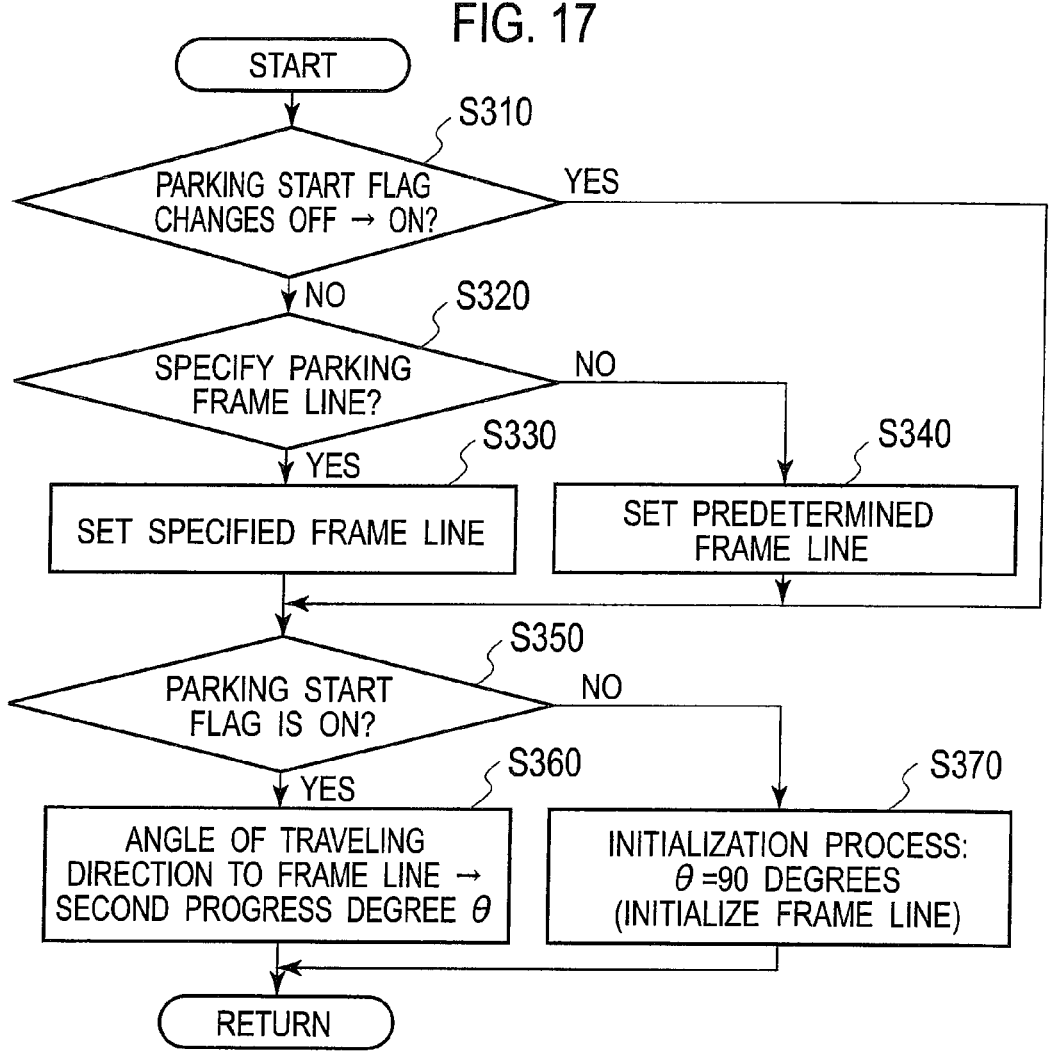
[FIG. 17] It is a flowchart showing processes performed by an angle progress judgment unit.
Figure 18:
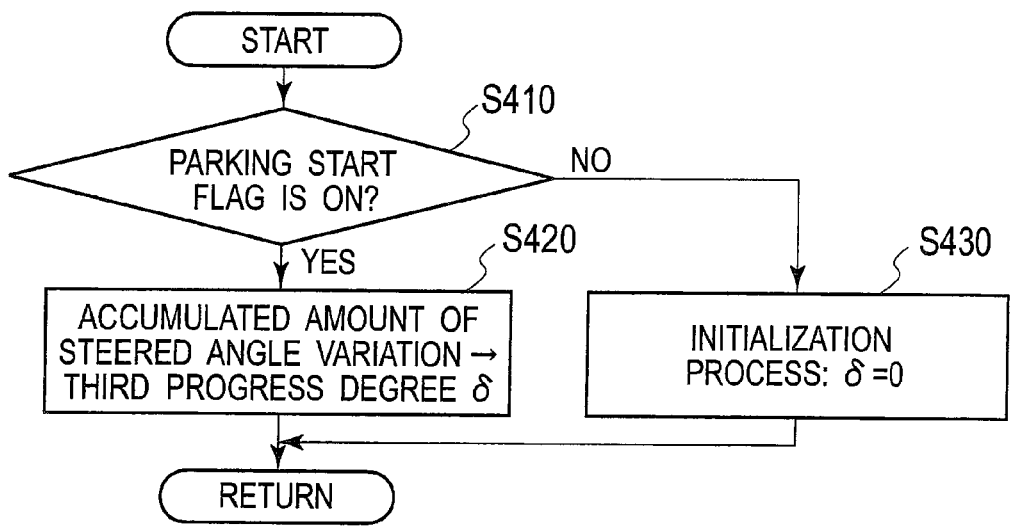
[FIG. 18] It is a flowchart showing processes performed by a steering progress judgment unit.

An example of processes by the distance progress judgment unit 562a will be explained with reference to FIG. 16. Note that the example of processes is done after the above-explained example of processes by the parking start judgment unit 561 shown in FIG. 15. After-explained processes shown in FIGS. 17 to 19 are also done after the above-explained example of processes by the parking start judgment unit 561 shown in FIG. 15, similarly.

The distance progress judgment unit 562a judges whether or not the parking start flag changes from OFF to ON (step S210). The process flow proceeds to a step S220 if the step S210 is affirmed, or proceeds to a step S260 if disaffirmed. Note that the parking start flag is set by the parking start judgment unit 561 as explained above.

When the step S210 is affirmed, it is judged whether or not a parking target position is specified (step S220). The process flow proceeds to a step S230 if the step S220 is affirmed, or proceeds to a step S240 if disaffirmed.

When the step S220 is affirmed, a distance to the specified parking target position is set as the distance d0 (step S230), and then the process flow proceeds to a step S250. On the other hand, when the step S220 is disaffirmed, a predetermined distance (e.g. 5 m) is set as the distance d0 (step S240), and then the process flow proceeds to the step S250.

Subsequently to the step S240 or S250, the parking start position is stored (step S250), and the process flow proceeds to the step S260. Subsequently to the step S250, it is judged whether or not the parking start flag is ON (step S260). The process flow proceeds to a step S270 if the step S260 is affirmed, or proceeds to a step S290 if disaffirmed.

When the step S260 is affirmed, a distance from the parking start position to the current position of the vehicle 1 is set as the distance d1 (step S270). Subsequently, the first parking progress degree d is calculated by the above equation (V) (step S280). Then, the process flow is terminated and then started from the step S210 again.

On the other hand, when the step S260 is disaffirmed, an initialization process is made (step S290). Specifically, the first parking progress degree d is set to "1", and the parking start position and the distances d0 and d1 are initialized. Then, the process flow is terminated and then started from the step S210 again.

In addition, the angle progress judgment unit 562b calculates a second parking progress degree θ based on an orientation of the vehicle 1 to the parking target position. Specifically, the angle progress judgment unit 562b calculates, as the second parking progress degree θ, an angle of a traveling direction of the vehicle 1 to the parking target position.

Figure 8:
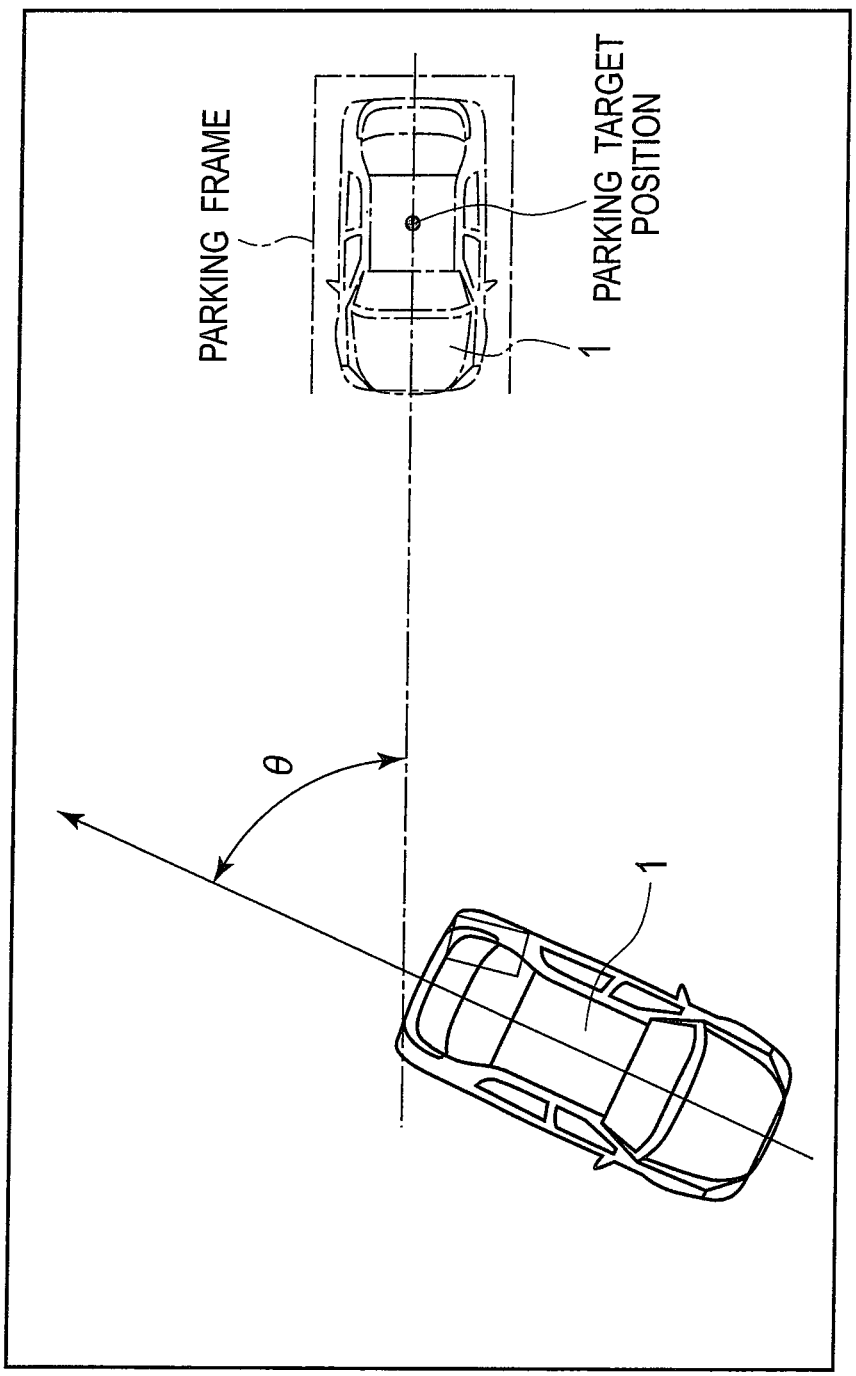
[FIG. 8] It is a plan view for explaining a second parking progress degree (a detected angle) $\theta$.

As shown in FIG. 8, the second parking progress degree θ is an angle of a current traveling direction of the vehicle 1 on the basis of an orientation (a front-back direction) of the vehicle 1 to be stopped at the parking target position. This can be calculated by detecting the angle of the traveling direction of the vehicle 1 to an extended direction of the parking frame line detected by the parking assist apparatus 22. Generally, the parking frame line is drawn on a road surface as a segmented line along a front-back direction of a vehicle at a parking target position. Therefore, similarly to a known method for detecting a line dividing driving lanes drawn on road lanes, the parking frame line can be detected by processing the image taken by the camera 22 with an edging process. The parking frame line detected as explained above is converted onto the top view, and the angle of the traveling direction of the vehicle 1 to the parking frame line can be detected. Also in a case where a passenger can specify a parking target position (a parking frame line), an angle of a traveling direction of the vehicle 1 to the specified parking frame line can be detected.

The second parking progress degree θ (≤90 degrees) takes a smaller value as closer to the parking completion.

An example of processes by the angle progress judgment unit 562b will be explained with reference to FIG. 17.

The angle progress judgment unit 562b judges whether or not the parking start flag changes from OFF to ON (step S310). The process flow proceeds to a step S320 if the step S310 is affirmed, or proceeds to a step S350 if disaffirmed.

When the step S310 is affirmed, it is judged whether or not a parking frame line is specified (step S320). The process flow proceeds to a step S330 if the step S320 is affirmed, or proceeds to a step S340 if disaffirmed.

The specified parking frame line is set when the step S320 is affirmed (step S330), or a preset parking frame line is set if disaffirmed (step S340). After the step S330 or S340, the process flow proceeds to the step S350.

After the step S330 or S340, it is judged whether or not the parking start flag is ON (step S350). The process flow proceeds to a step S360 if the step S350 is affirmed, or proceeds to a step S370 if disaffirmed.

When the step S350 is affirmed, an angle of a traveling direction of the vehicle 1 to the parking frame line is set as the second parking progress degree θ (step S360). Then, the process flow is terminated and then started from the step S310 again.

On the other hand, when the step S350 is disaffirmed, an initialization process is made (step S370). Specifically, the second parking progress degree θ is set to "90 degrees", and the parking flame line is also initialized. Then, the process flow is terminated and then started from the step S310 again.

In addition, the steering progress judgment unit 562c calculates an accumulated amount of a steered angle variation from the parking start as a third parking progress degree δ. The third parking progress degree δ takes a larger value as closer to the parking completion.

An example of processes by the steering progress judgment unit 562c will be explained with reference to FIG. 18.

The steering progress judgment unit 562c judges whether or not the parking start flag changes from OFF to ON (step S410). The process flow proceeds to a step S420 if the step S410 is affirmed, or proceeds to a step S430 if disaffirmed.

When the step S410 is affirmed, the accumulated amount of a steered angle variation is set as the third parking progress degree δ (step S420). Then, the process flow is terminated and then started from the step S410 again.

On the other hand, when the step S410 is disaffirmed, an initialization process is made (step S430). Specifically, the third parking progress degree δ is set to "0". Then, the process flow is terminated and then started from the step S410 again.

In addition, the time progress judgment unit 562d calculates an elapsed time from the parking as a fourth parking progress degree t. The larger the fourth parking progress degree t is, the closer to the parking completion.

An example of processes by the time progress judgment unit 562d will be explained with reference to FIG. 19.

The time progress judgment unit 562d judges whether or not the parking start flag changes from OFF to ON (step S510). The process flow proceeds to a step S520 if the step S510 is affirmed, or proceeds to a step S530 if disaffirmed.

When the step S510 is affirmed, the elapsed time is set as the fourth parking progress degree t (step S520). Then, the process flow is terminated and then started from the step S510 again.

On the other hand, when the step S510 is disaffirmed, an initialization process is made (step S530). Specifically, the fourth parking progress degree t is set to "0". Then, the process flow is terminated and then started from the step S510 again.

In addition, the progress gain computing unit 563 calculates a parking progress gain β based on the first to fourth parking progress degrees d, θ, δ and t calculated by the parking progress judgment unit 562.

Figure 9:
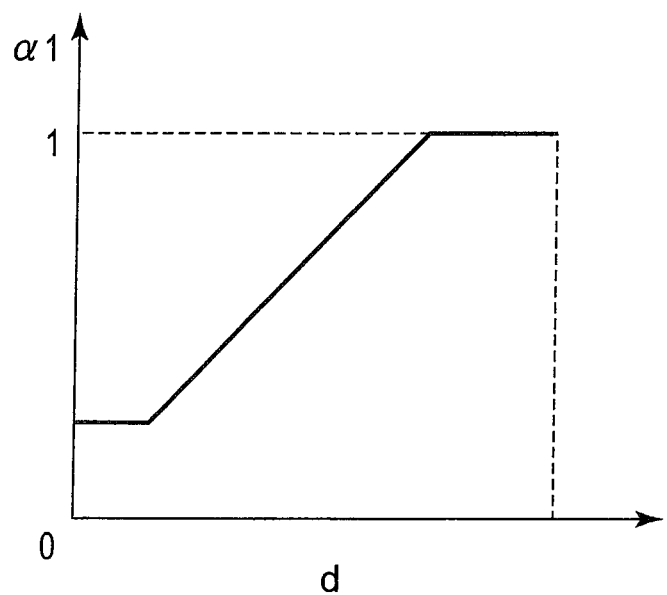
[FIG. 9] It is a graph showing a relation between a first parking progress degree d and a first parking progress gain $\alpha 1$.
Figure 10:
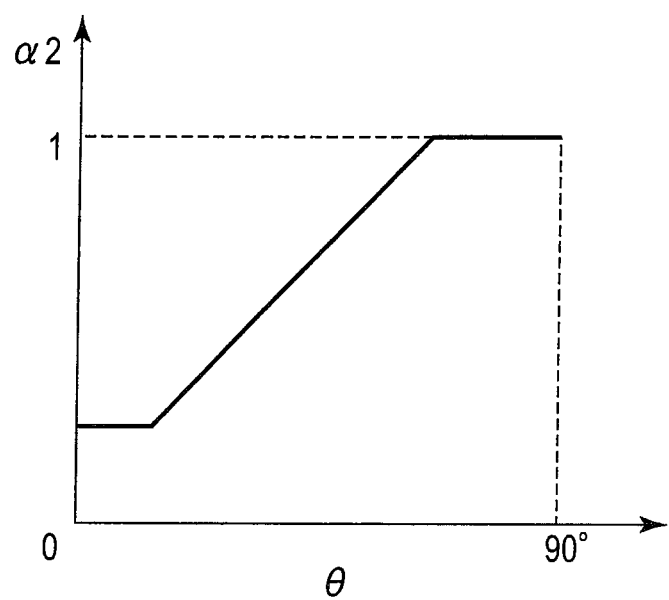
[FIG. 10] It is a graph showing a relation between the second parking progress degree $\theta$ and a second parking progress gain $\alpha 2$.
Figure 11:
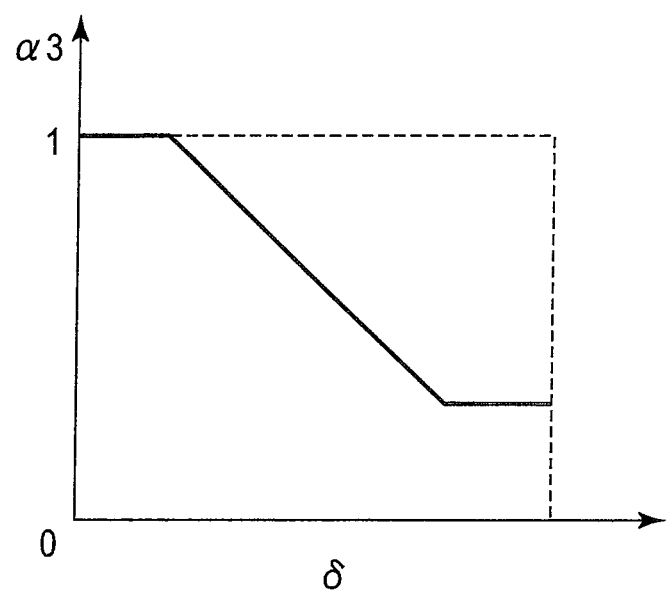
[FIG. 11] It is a graph showing a relation between a third parking progress degree $\delta$ and a third parking progress gain $\alpha 3$.
Figure 12:
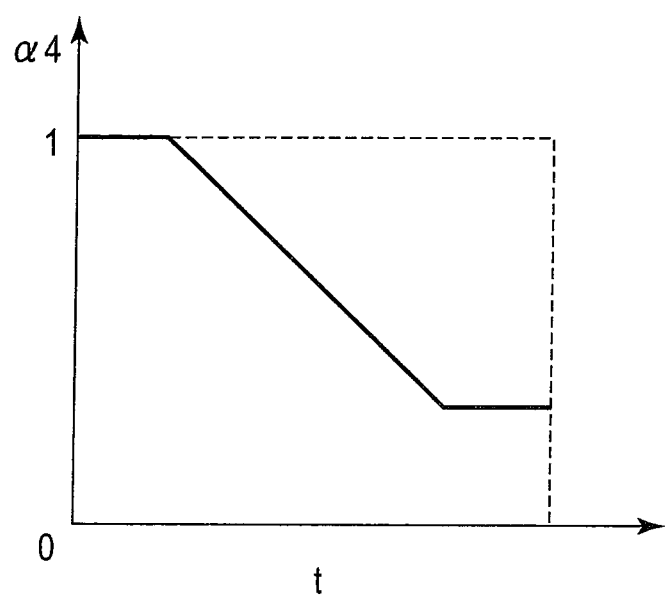
[FIG. 12] It is a graph showing a relation between a fourth parking progress degree t and a fourth parking progress gain $\alpha 4$.

As shown in FIG. 9, the progress gain computing unit 563 calculates a first progress gain α1 from the first parking progress degree d. The first progress gain α1 (≤1) takes a smaller value, as the first parking progress degree d is smaller (closer to the parking completion). In addition, as shown in FIG. 10, the progress gain computing unit 563 calculates a second progress gain α2 from the second parking progress degree θ. The second progress gain α2 (≤1) takes a smaller value, as the second parking progress degree θ is smaller (closer to the parking completion). In addition, as shown in FIG. 11, the progress gain computing unit 563 calculates a third progress gain α3 from the third parking progress degree δ. The third progress gain α3 (≤1) takes a smaller value, as the third parking progress degree δ is larger (closer to the parking completion). In addition, as shown in FIG. 12, the progress gain computing unit 563 calculates a fourth progress gain α4 from the fourth parking progress degree t. The fourth progress gain α4 (≤1) takes a smaller value, as the fourth parking progress degree t is larger (closer to the parking completion).

Then, the progress gain computing unit 563 calculates a parking progress gain β based on an equation (VI) shown below.

$$\beta = \alpha 1 \times \alpha 2 \times \alpha 3 \times \alpha 4 \qquad (VI)$$

Therefore, when it is judged that the vehicle is traveling to the parking target position, $\beta min \leq \beta < 1$. On the other hand, when it is judged that the vehicle is not traveling to the parking target position, $\beta = 1$. Note that a weighting coefficient may be set to the above first to fourth progress gains α1 to α4.

Processes by the progress gain computing unit 563 will be explained with reference to FIG. 20.

The progress gain computing unit 563 judges whether or not the parking start flag changes from OFF to ON (step S610). The process flow proceeds to a step S620 if the step S610 is affirmed, or proceeds to a step S680 if disaffirmed.

When the step S610 is affirmed, the first progress gain α1 is calculated from the first parking progress degree d (step S620). Subsequently, the second progress gain α2 is calculated from the second parking progress degree θ (step S630). Subsequently, the third progress gain α3 is calculated from the third parking progress degree δ (step S640). Subsequently, the fourth progress gain α4 is calculated from the fourth parking progress degree t (step S650). Then, the process flow proceeds to a step S660.

After the step S650, the parking progress gain β is calculated base on the above equation (VI) (step S660). After the step S660, the parking progress gains β1 to β4 are calculated, respectively, based on an equation (VII) shown below (step S670). Then, the process flow is terminated and then started from the step S610 again. Here, ki is an adjustment preset constant for each control (braking, applying a pedal reaction force, alarming and restricting a drive force).

$$\beta i = ki \times \beta (i = 1 \sim 4) \qquad (VII)$$

On the other hand, when the step S610 is disaffirmed, the parking progress gain β is initialized (step S680). Specifically, the parking progress gain β is set to "1". Aster the step S680, the parking progress gains β1 to β4 are initialized (step S690). Specifically, the parking progress gains β1 to β4 are set to "1", respectively. Then, the process flow is terminated and then started from the step S610 again.

(Parking Operation Assist Unit 600)

The brake judgment unit 610 compares the relative distance of the obstacle X to the vehicle 1 output from the environment information retriever 200 with the brake operation distance Lsb set by the brake operation distance computing unit 520 to judge whether or not a condition (i) shown below is met. When the condition (i) is met, the brake judgment unit 610 outputs, to the brake controller 620, an operational command to apply a brake force for the driving assist.

(Brake operation distance $Lsb$)>(Relative distance of obstacle $X$ to vehicle 1)  (i)

Here, when the parking progress gain β is smaller than 1, i.e. it is judged that the vehicle 1 is traveling, an output of the operational command is prohibited. Alternatively, a judgment for the above condition (i) is made based on a compensated brake operation distance Lsb calculated by multiplying the brake operation distance Lsb by a gain β1 (<1). The gain β1 is calculated by the above equation (VII) as shown below. Here, k1 is an adjustment preset constant.

$$\beta1 = k1 \times \beta \quad \text{(VII)}$$

Note that, since the environment information retriever 200 detects a relative distance of an obstacle closest to the vehicle 1 that is specified as the obstacle X of a control object when plural obstacles exist, a relative distance of an obstacle to the vehicle 1 output from the environment information retriever 200 is a relative distance to the closest obstacle X.

The brake controller 620 receives the operational command from the brake judgment unit 610, and then executes a brake force application control for the driving assist as explained below.

Upon starting the operation, a brake pressure command value is increased at a preset increasing rate until it reaches up to a preset target command value. When the brake pressure command value is increased up to the target command value, a brake pressure by the target command value is maintained. Subsequently, when a preset time has elapsed after a stop of the vehicle 1 (the vehicle speed=0) was detected, the brake pressure command value is reduced at a preset reducing rate.

The target command value, the increasing rate and the reducing rate explained above may be changed according to the vehicle speed of the vehicle 1, the relative speed of the obstacle X or an estimated time for the vehicle 1 to contact with the obstacle X (TTC [time-to-contact]).

Here, the brake control by the driving assist will be stopped when it is detected that a driver operates a brake pedal by equal-to or more-than a predetermined stroke based on a brake pedal stroke output from the vehicle information retriever 100 or when another brake control that has a higher priority than that of the drive assist control is operated.

The brake force generator 15 generates a brake pressure so as to adjust it to a target command value calculated by the brake controller 620.

In addition, the pedal reaction force judgment unit 630 compares the relative distance of the obstacle X to the vehicle 1 output from the environment information retriever 200 with the pedal reaction force operation distance Lsa set by the pedal reaction force operation distance computing unit 530, and judges whether or not a condition (ii) shown below is met. When the condition (ii) is met, the pedal reaction force judgment unit 630 outputs, to the pedal reaction force controller 640, an operational command for applying a pedal reaction force to the acceleration pedal by the driving assist.

(Pedal reaction force operation distance $Lsa$)>(Relative distance of obstacle $X$ to vehicle 1)  (ii)

Here, when the parking progress gain β is smaller than 1, i.e. it is judged that the vehicle 1 is traveling, an output of the operational command for applying a pedal reaction force by the driving assist is prohibited. Alternatively, a judgment for the above condition (ii) is made based on a compensated pedal reaction force operation distance Lsa calculated by multiplying the pedal reaction force operation distance Lsa by a gain β2 (<1). The gain β2 is calculated by the above equation (VII) as shown below. Here, k2 is an adjustment preset constant.

$$\beta2 = k2 \times \beta \quad \text{(VII)}$$

The pedal reaction force controller 640 receives the operational command from the pedal reaction force judgment unit 630, and then executes a pedal reaction force application control for the driving assist as explained below.

Upon starting the operation, a reaction force command value is increased at a preset increasing rate until it reaches up to a preset target command value. When the reaction force command value is increased up to the target command value, a reaction force by the target command value is maintained. Subsequently, when a preset time has elapsed after a stop of the vehicle 1 (the vehicle speed=0) was detected, the reaction force command value is reduced at a preset reducing rate.

The target command value, the increasing rate and the reducing rate explained above may be changed according to the vehicle speed of the vehicle 1, the relative speed of the obstacle X or an estimated time for the vehicle 1 to contact with the obstacle X (TTC).

The pedal reaction force generator 16 generates a pedal reaction force so as to adjust it to a target command value calculated by the pedal reaction force controller 640.

In addition, the alarm judgment unit 650 compares the relative distance of the obstacle X to the vehicle 1 output from the environment information retriever 200 with the alarm operation distance Lsh set by the alarm operation distance computing unit 540, and judges whether or not a condition (iii) shown below is met. When the condition (iii) is met, the alarm judgment unit 650 outputs, to the alarm controller 660, an operational command for alarming by the driving assist.

(Alarm operation distance $Lsh$)>(Relative distance of obstacle $X$ to vehicle 1)  (iii)

Here, when the parking progress gain β is smaller than 1, i.e. it is judged that the vehicle 1 is traveling, an output of the operational command for alarming by the driving assist is prohibited. Alternatively, a judgment for the above condition (iii) is made based on a compensated alarm operation distance Lsh calculated by multiplying the alarm operation distance Lsh by a gain β3 (<1). The gain β3 is calculated by the above equation (VII) as shown below. Here, k3 is an adjustment preset constant.

$$\beta3 = k3 \times \beta \quad \text{(VII)}$$

The alarm controller 660 receives the operational command from the alarm judgment unit 650, and then generates an alarming drive signal for repeating outputs and stops of an alarming sound for a predetermined alarming time.

The alarm 17 generates the alarming sound based on the alarming drive signal input from the alarm controller 660.

Note that the alarm 17 is not limited to one that outputs a sound, but may be configured to alarm by generating lights or vibrations of a seat.

In addition, the drive force judgment unit 670 compares the relative distance of the obstacle X to the vehicle 1 output from the environment information retriever 200 with the drive force operation distance Lsf set by the drive force operation distance computing unit 550, and judges whether or not a condition (iv) shown below is met. When the condition (iv) is met, the drive force judgment unit 670 outputs, to the drive force controller 680, an operational command for restricting a drive force by the driving assist.

(Drive force operation distance $Lsf$)>(Relative distance of obstacle X to vehicle 1)              (iv)

Here, when the parking progress gain β is smaller than 1, i.e. it is judged that the vehicle 1 is traveling, an output of the operational command for restricting a drive force by the driving assist is prohibited. Alternatively, a judgment for the above condition (iv) is made based on a compensated drive force operation distance Lsf calculated by multiplying the pedal reaction force operation distance Lsf by a gain β4 (<1). The gain β4 is calculated by the above equation (VII) as shown below. Here, k4 is an adjustment preset constant.

$$\beta 4 = k4 \times \beta \quad\quad\quad (VII)$$

The drive force controller 680 receives the operational command from the drive force judgment unit 670, and then executes a drive force restriction control for the driving assist as explained below.

Upon starting the operation, a command value for an acceleration pedal stroke reduction amount is increased at a preset increasing rate until it reaches up to a preset target command value. When the command value for the acceleration pedal stroke reduction amount is increased up to the target command value, the acceleration pedal stroke reduction amount by the target command value is maintained. Subsequently, when the control using the acceleration pedal stroke reduction amount of the target command value has been continued for a predetermined time, the command value for the acceleration pedal stroke reduction amount is reduced at a preset reducing rate.

The target command value, the increasing rate and the reducing rate explained above may be changed according to the vehicle speed of the vehicle 1, the relative speed of the obstacle X or an estimated time for the vehicle 1 to contact with the obstacle X (TTC).

Here, a throttle opening of the engine is calculated by an equation (VIII) shown below.

(Throttle opening)=(Operated acceleration pedal stroke amount)−(Calculated stroke reduction amount)              (VIII)

The drive force generator 14 controls an output of the drive apparatus of the vehicle 1 (here, an engine output) based on the throttle opening calculated by the drive force controller 680.

Note that, although the parking progress gain β is calculated by multiplying the first to fourth progress gains α1 to α4 in the above embodiment, it is not limited to this. For example, one of the first to fourth progress gains α1 to α4 may be set as the parking progress gain β. Alternatively, the parking progress gain β may be calculated by multiplying any two or more gains among the first to fourth progress gains α1 to α4.

(Operations)

An example of operations of the parking assist control apparatus 2 will be explained. Note that the command switch is turned ON and the driving assist control system is activated. In addition, parking in a parking lot shown in FIGS. 13 and 14 will be explained as an example.

Figure 13:
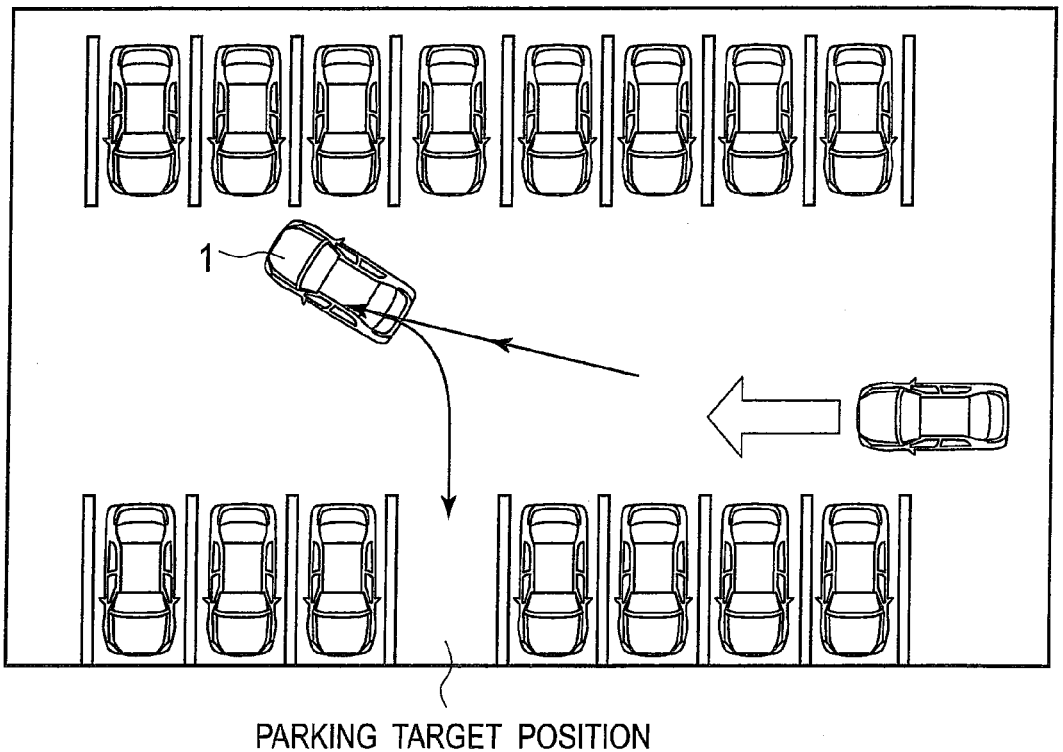
[FIG. 13] It is a plan view showing an example in which a driving assist control is restricted.
Figure 14:
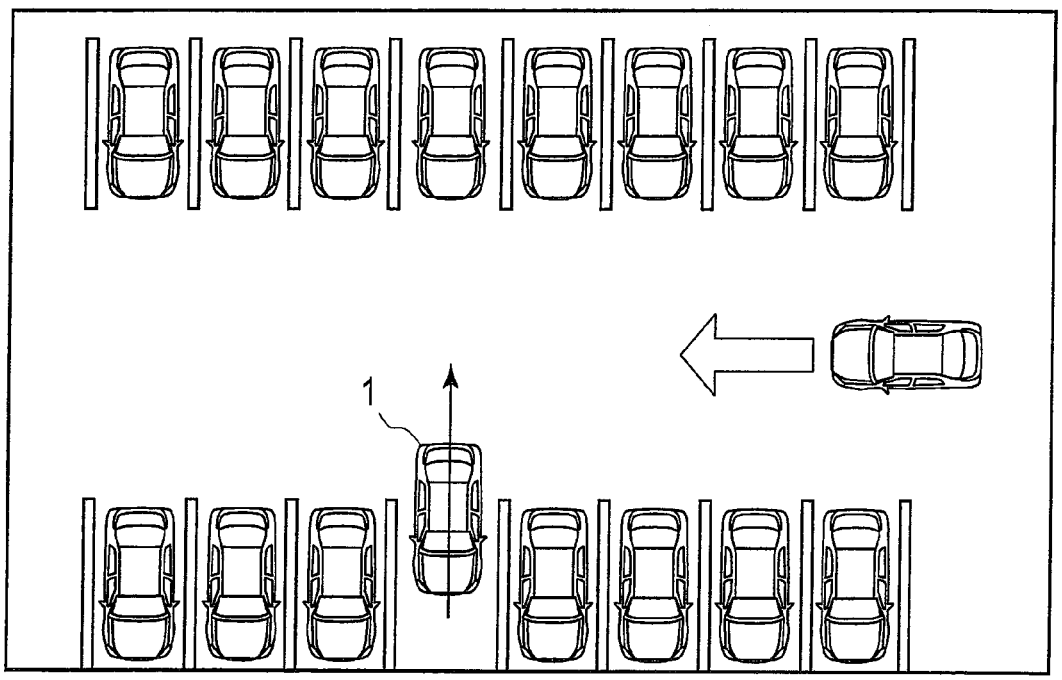
[FIG. 14] It is a plan view showing an example in which a driving assist control is not restricted.

When the shift range is set to a backward running (R) range for parking with backward running from a position of the vehicle 1 shown in FIG. 13, the driving assist control is put into an operable state (ST-FLG=ON). In addition, the top view is displayed on the display by the parking assist apparatus 22. When one of park-able areas displayed in the top view is specified by a passenger, it is judged that parking is started.

Subsequently, the obstacle detector (obstacle detection means) 13 detects the obstacle X (such as another vehicle and a wall) behind the vehicle 1. In addition, the relative distance computing unit (distance detection means) 203 calculates (detects) a distance between the detected obstacle X and the vehicle 1 in predetermined control cycles.

The parking operation assist unit 600 judges repeatedly in predetermined control cycles whether or not the distance to the obstacle X becomes equal-to or shorter-than the operation start distance while the vehicle 1 is running backward. Then, when the distance to the obstacle X becomes equal-to or shorter-than the operation start distance, the parking operation assist unit 600 executes the drive assist control in order to prevent the vehicle 1 from approaching closely to the obstacle X. The close approach prevention between the obstacle X and the vehicle 1 is done by executing at least one of an alarm to a driver, a brake force application to the vehicle 1, a restriction of increasing of a drive force of the vehicle 1, and a reaction force application to an acceleration pedal.

In the present embodiment, the drive assist control is restricted while the vehicle 1 is running backward for parking. Namely, as explained above, (βmin≤) β<1 is established while the vehicle 1 is running backward for parking, and thereby an output of the operational command by the driving assist control for a close approach between the obstacle X and the vehicle 1 is prohibited when β<1. Alternatively, the driving assist control is prohibited through judgments of the above-explained conditions (i) to (iv) using the gains βi (<1: i=1~4) for each of the controls (braking, the application of a pedal reaction force, alarming and the restriction of a drive force). As a result, a feeling of strangeness caused by operations of the driving assist control can be prevented.

Namely, in a case where another vehicle approaches while the vehicle 1 is traveling to a parking target position, the other vehicle generally stops or reduces its speed. In this case, if the control start distance is long, a driver of the vehicle 1 feels that a control start is too early. In other words, if the driving assist control for preventing a close approach between the vehicle 1 and another vehicle (an obstacle X) is started with a long distance between the vehicle 1 and the other vehicle (the obstacle X), a driver of the vehicle 1 gets a feeling of strangeness that its control start is too early. In the present embodiment, the driver's feeling of strangeness can be reduced by restricting the driving assist control. Note that, even in a case where it was judged that parking was started, the normal driving assist control will be executed if it is judged that the vehicle 1 is not traveling due to a parking completion or a stop for a predetermined time (i.e. 13=1).

The above operations are similarly done even during parking such as a parallel parking. Namely, the driving assist control is restricted while traveling to a parking target position, so that a feeling of strangeness due to the driving assist control can be prevented. Note that it is preferable that the above-explained first progress gain α2 (the gain for a traveling direction of the vehicle 1 to parking target position) is not used in a case of a parallel parking.

On the other hand, it is not judged that it is not traveling to a parking target position in a case where the vehicle 1 is got out from a parked position by backward running, so that the driving assist control is not restricted and the needful driving assist control is executed (a close approach between the obstacle X and the vehicle 1 is prevented). Namely, in a case where the vehicle 1 is traveling but not traveling to a parking target position (e.g. getting out from a parked position), it may be hard for a driver of another vehicle to recognize getting-out of the vehicle 1 and hard to stop the other vehicle or reduce its speed. If the control start distance is short in such a case, a driver of the vehicle 1 gets a feeling of strangeness that its control start is too late. In the present embodiment, if not traveling to a parking target position, the driving assist control is not restricted but adequately executed.

As explained above, according to the present embodiment, the control start distance is set shorter when traveling to a parking target position [multiplying compensation by $\beta i$ ($<1$) of Lsb, Lsa, Lsh and Lsf] than when not traveling to a parking target position, so that the driving assist control can be executed at an appropriate time according to a state of the vehicle 1 (during a parking travel). As a result, it can be prevented to give a feeling of strangeness to a driver.

Here, in the above descriptions, a case of a restriction by prohibiting the control and a case of a restriction by making the control start distance (an operation judgment threshold value) shorter to make an intervention by the driving assist control withheld [multiplying compensation of the control start distance, i.e. by $\beta i$ ($<1$) of Lsb, Lsa, Lsh and Lsf] are explained as examples for the restriction of the driving assist control. Namely, an assist control amount of the driving assist control is reduced by prohibiting the driving assist control or by making an intervention by the driving assist control withheld. Instead of these, an assist control amount of the driving assist control may be reduced by making the control amount of the driving assist control lowered. Fro example, the control amount can be made lowered by multiplying, by the gain $\beta$ ($<1$), a target brake pressure by the brake controller 620, a pedal reaction force amount by the pedal reaction force controller 640, a sound volume by the alarm controller 660, and/or a drive force restriction amount by the drive force controller 680. In addition, the driving assist control may be restricted by using a predetermined restriction compensation amount instead of the compensation of the control start distance (an operation judgment threshold value) or the control amount by using the gain $\beta$ or $\beta i$.

In addition, in the above descriptions, the brake force application by the brake force generator 15, the reaction force application to the acceleration pedal by the pedal reaction force generator 16, the alarm to a drive by the alarm 17 and the drive force restriction by the drive force generator 14 are explained as examples of the driving assist control. However, the driving assist control may be executed by one or any combination of these controls.

In addition, in the above embodiment, the driving assist control while the vehicle 1 is running backward (during the control for preventing a close approach between an obstacle X and the vehicle 1) is explained as an example, but the above driving assist control can be executed while the vehicle 1 is running forward.

(Advantages of Present Embodiment)

(1) When a distance of an obstacle X to a vehicle 1 detected by the obstacle detectors 13 becomes equal-to or shorter than a predetermined control start distance, the parking operation assist unit 600 assists driving by a driver of the vehicle 1 by executing a driving assist control for preventing a close approach between the obstacle X and the vehicle 1. The parking start judgment unit 561 judges a parking start. The parking progress judgment unit 562 judges a parking progress between the parking start judged by the parking start judgment unit 561 and a parking completion. The parking progress computing unit 560 reduces an assist control amount to the parking operation assist unit 600 according to the parking progress judged by the parking progress judgment unit 562.

When another vehicle approaches to the vehicle 1 traveling to a parking target position, the driver of the vehicle 1 tends to finish parking quickly. In addition, when the other vehicle approaches to the vehicle 1 traveling to the parking target position, the other vehicle generally stops or reduces its speed. Therefore, if the driving assist control for preventing a close approach between the obstacle X and the vehicle 1 intervenes while the vehicle 1 is traveling to the parking target position, the driver of the vehicle 1 may get a feeling of strangeness. Thus, according to the present embodiment, the driving assist control can be executed appropriately. As a result, it can be possible to reduce a feeling of strangeness of the driver.

(2) When a distance of an obstacle X to a vehicle 1 detected by the relative distance computing unit 203 becomes equal-to or shorter than a predetermined control start distance, the parking operation assist unit 600 assists driving by a driver of the vehicle 1 by executing a driving assist control for preventing a close approach between the obstacle X and the vehicle 1. The parking start judgment unit 561 judges whether or not the vehicle 1 is traveling to a parking target position. When the parking start judgment unit 561 judges that the vehicle 1 is traveling to the parking target position, the parking progress computing unit 560 restricts the driving assist control by the parking operation assist unit 600.

When another vehicle approaches to the vehicle 1 traveling to the parking target position, the driver of the vehicle 1 tends to finish parking quickly. In addition, when the other vehicle approaches to the vehicle 1 traveling to the parking target position, the other vehicle generally stops or reduces its speed. Therefore, the driving assist control can be executed appropriately by restricting the driving assist control while the vehicle 1 is traveling to the parking target position to withhold an intervention by the driving assist control in parking operations. As a result, the driving assist control can be executed appropriately according to a situation of the vehicle 1, and thereby the driver can be prevented from getting a feeling of strangeness.

(3) The parking progress judgment unit 562 judges a parking progress degree(s) from a start of traveling of vehicle 1 to a parking target position to a parking completion. The parking progress computing unit 560 increases a restriction of the driving assist control by the parking operation assist unit 600 more, as the judged parking progress degree(s) is closer to the parking completion.

When another vehicle approaches to a vehicle 1 traveling to the parking target position, the driver of the vehicle 1 tends to finish parking more quickly, as the parking progress proceeds further (closer to the parking completion). Therefore, the driving assist control can be executed appropriately by restricting the driving assist control more as the parking progress proceeds further (closer to the parking completion) to withhold an intervention by the driving assist control in parking operations. As a result, the driving assist control can be executed appropriately according to a situation of the vehicle 1, and thereby the driver can be prevented from getting a feeling of strangeness.

(4) The parking progress judgment unit 562 judges a parking progress degree based on a travel distance of a vehicle 1 from a parking start position to a parking target position. Therefore, the parking progress degree can be judged from a start of traveling of the vehicle to the parking target position to a parking completion based on the travel distance.

(5) The parking progress judgment unit 562 judges a parking progress degree based on an orientation of a vehicle 1 to a parking target position. Therefore, the parking progress degree can be judged from a start of traveling of the vehicle 1 to the parking target position to a parking completion based on the orientation of the vehicle 1. Note that it can be assumed that it is closer to the parking completion as a current orientation of the vehicle 1 is closer to an orientation of a vehicle at the parking target position.

(6) The parking progress judgment unit 562 judges a parking progress degree based on an accumulated amount of a steered angle variation from a start of traveling of a vehicle 1 to a parking target position. Therefore, the parking progress degree can be judged from the start of traveling of the vehicle 1 to a parking completion based on the accumulated amount of a steered angle variation.

(7) The parking progress judgment unit 562 judges a parking progress degree based on an elapsed time from a start of traveling of a vehicle 1 to a parking target position. Therefore, the parking progress degree can be judged from the start of traveling of the vehicle 1 to a parking completion based on the elapsed time.

(8) The restriction of the driving assist control by the parking operation assist unit 600 is at least one of a prohibition of the driving assist control, a shortening of the control start distance and a reduction of a control amount for the driving assist control. According to this, the driving assist control for preventing a close approach between a vehicle 1 and an obstacle X can be restricted.

(9) The driving assist control by the parking operation assist unit 600 for preventing a close approach between a vehicle 1 and an obstacle X is at least one of an alarm to a driver, a brake force application to the vehicle 1, a restriction of increasing of a drive force of the vehicle 1, and a reaction force application to an acceleration pedal. According to this, a close approach between the vehicle 1 and the obstacle X can be prevented.

The entire contents of a Japanese Patent Application No. 2010-144804 (filed on Jun. 25, 2010) and a Japanese Patent Application No. 2011-33011 (filed on Jun. 18, 2011) are incorporated into this Description by reference. Although the invention has been described above by reference to a certain embodiment of the invention, the invention is not limited to the embodiment described above. Scope of the present invention is determined in the context of the claims.

The invention claimed is:

1. A parking assist control apparatus comprising:
   an obstacle detector that is provided at a rear of a vehicle to detect an obstacle behind the vehicle;
   a parking assist unit that executes, when judges that a distance between the obstacle detected by the obstacle detector and the vehicle becomes equal-to or shorter-than a predetermined control start distance, a parking assist for preventing a close approach between the obstacle and the vehicle based on an assist control operational amount during a backward running of the vehicle from a parked position and a backward running of the vehicle for parking;
   a parking start judgment unit that judges a start of a parking operation in which a backward running is done after a predetermined forward running; and
   an assist control amount reduction unit that reduces, when the start of the parking operation is judged by the parking start judgment unit, the assist control operational amount by the parking assist unit during the backward running of the vehicle for parking less than the an assist control operational amount by the parking assist unit at the backward running of the vehicle from a parked position, wherein
   the parking assist by the parking assist unit is at least one control of a brake force application to the vehicle and a restriction of a drive force of the vehicle.

2. The parking assist control apparatus according to claim 1, wherein
   the parking start judgment unit judges the start of a parking operation when a shift range of the vehicle is set to a backward running range after a predetermined-distance or predetermined-time running with the shift range set to a forward running range.

3. The parking assist control apparatus according to claim 1, wherein the restriction of a drive force includes a reaction force application to an acceleration pedal.

4. The parking assist control apparatus according to claim 1, further comprising
   a parking progress judgment unit that judges a parking progress degree during the parking operation judged by the parking start judgment unit; and
   a parking progress computing unit that reduces the assist control operational amount by the parking assist unit according to the parking progress degree judged by the parking progress judgment unit.

5. The parking assist control apparatus according to claim 4, wherein
   the parking progress computing unit reduces the assist control operational amount by the parking assist unit more as the parking progress degree judged by the parking progress judgment unit is closer to a parking completion.

6. The parking assist control apparatus according to claim 5, wherein
   the parking progress judgment unit judges the parking progress degree based on a distance between the vehicle and a parking target position at a time of a parking start and a travel distance of the vehicle after the parking start.

7. The parking assist control apparatus according to claim 5, wherein
   the parking progress judgment unit judges the parking progress degree based on an orientation of the vehicle to a parking target position.

8. The parking assist control apparatus according to claim 5, wherein
   the parking progress judgment unit judges the parking progress degree based on an accumulated amount of a steered angle variation from a parking start.

9. The parking assist control apparatus according to claim 5, wherein
   the parking progress judgment unit judges the parking progress degree based on an elapsed time after a parking start.

10. A parking assist control apparatus comprising:
    an obstacle detector that is provided at a rear of a vehicle to detect an obstacle behind the vehicle;
    a parking assist unit that executes, when judges that a distance between the obstacle detected by the obstacle detector and the vehicle becomes equal-to or shorter-than a predetermined control start distance, a parking assist for preventing a close approach between the obstacle and the vehicle based on an assist control operational amount during a backward running of the vehicle from a parked position and a backward running of the vehicle for parking;

a parking start judgment unit that judges a start of a parking operation in which a backward running is done after a predetermined forward running; and an assist control amount reduction unit that reduces, when the start of the parking operation is judged by the parking start judgment unit, the assist control operational amount by the parking assist unit during the backward running of the vehicle for parking less than the assist control operational amount by the parking assist unit at the backward running of the vehicle from a parked position, wherein the parking assist by the parking assist unit is at least one control of a brake force application to the vehicle and a restriction of a drive force of the vehicle, and a reduction of the assist control operational amount by the assist control amount reduction unit is done by a shortening of the parking start distance.

11. The parking assist control apparatus according to claim 10, wherein the restriction of a drive force includes a reaction force application to an acceleration pedal.

12. A parking assist control apparatus comprising:

an obstacle detection means provided at a rear of a vehicle for detecting an obstacle behind the vehicle;

a parking assist means for executing, when judging that a distance between the obstacle detected by the obstacle detection means and the vehicle becomes equal-to or shorter-than a predetermined control start distance, a parking assist for preventing a close approach between the obstacle and the vehicle based on an assist control operational amount during a backward running of the vehicle from a parked position and a backward running of the vehicle for parking;

a parking judgment means for judging a start of a parking operation in which a backward running is done after a predetermined forward running; and an assist control amount reduction means for reducing, when the start of the parking operation is judged, the assist control operational amount by the parking assist means during the backward running of the vehicle for parking less than the assist control operational amount by the parking assist means at the backward running of the vehicle from a parked position, wherein the parking assist by the parking assist means is at least one control of a brake force application to the vehicle and a restriction of a drive force of the vehicle.

13. A parking assist control method comprising:
detecting an obstacle behind a vehicle;
judging whether or not a distance between the obstacle and the vehicle becomes equal-to or shorter-than a predetermined control start distance during a backward running of the vehicle from a parked position and a backward running of the vehicle for parking;
executing a parking assist for preventing a close approach between the obstacle and the vehicle based on an assist control operational amount when it is judged that the distance between the obstacle and the vehicle becomes equal-to or shorter-than a predetermined control start distance;
judging a start of a parking operation in which a backward running is done after a predetermined forward running; and
reducing, when the start of the parking operation is judged, the assist control operational amount for the parking assist during the backward running of the vehicle for parking less than the assist control operational amount at the backward running of the vehicle from a parked position, wherein the parking assist is at least one control of a brake force application to the vehicle and a restriction of a drive force of the vehicle.

14. A parking assist control apparatus comprising:

an obstacle detector that is provided at a rear of a vehicle to detect an obstacle behind the vehicle;

a parking assist unit that executes, when judges that a distance between the obstacle detected by the obstacle detector and the vehicle becomes equal-to or shorter-than a predetermined control start distance, a parking assist for preventing a close approach between the obstacle and the vehicle based on an assist control operational amount during a backward running of the vehicle from a parked position and a backward running of the vehicle for parking;

a parking start judgment unit that judges a parking operation in which the vehicle is running backward to a parking target position; and an assist control amount reduction unit that reduces, when the parking start judgment unit judges the parking operation, the assist control operational amount by the parking assist unit during the backward running of the vehicle for parking less than the assist control operational amount by the parking assist unit at the backward running of the vehicle from a parked position, wherein the parking assist by the parking assist unit is at least one control of a brake force application to the vehicle and a restriction of a drive force of the vehicle.

15. A parking assist control apparatus comprising:

an obstacle detector that is provided at a rear of a vehicle to detect an obstacle behind the vehicle;

a parking assist unit that executes, when judges that a distance between the obstacle detected by the obstacle detector and the vehicle becomes equal-to or shorter-than a predetermined control start distance, a parking assist for preventing a close approach between the obstacle and the vehicle based on an assist control operational amount during a backward running of the vehicle from a parked position and a backward running of the vehicle for parking;

a parking start judgment unit that judges a start of a parking operation in which a backward running is done after a predetermined forward running; and an assist control amount reduction unit that reduces, when the start of the parking operation is judged by the parking start judgment unit, the assist control operational amount by the parking assist unit during the backward running of the vehicle for parking less than the assist control operational amount by the parking assist unit at the backward running of the vehicle from a parked position, wherein the parking assist by the parking assist unit is at least one control of a brake force application to the vehicle and a restriction of a drive force of the vehicle, and a reduction of the assist control operational amount by the assist control amount reduction unit is done by a lowering of the assist control operational amount.

\* \* \* \* \*